United States Patent
Schmitz et al.

(10) Patent No.: US 6,768,721 B1
(45) Date of Patent: Jul. 27, 2004

(54) METHOD AND APPARATUS FOR MONITORING DIFFERENT CHANNELS IN AN IEEE 802.11 WIRELESS LAN

(75) Inventors: Peter O. Schmitz, Nettetal (DE); Dominick A. Cafarelli, Ossining, NY (US); James P. Anderson, Boonton, NJ (US); Elazar Rosenthal, New York, NY (US)

(73) Assignee: Networks Associates Technology, Inc., Santa Clara, CA (US)

(*) Notice: Subject to any disclaimer, the term of this patent is extended or adjusted under 35 U.S.C. 154(b) by 404 days.

(21) Appl. No.: 10/001,779

(22) Filed: Oct. 26, 2001

(51) Int. Cl.[7] .............................................. G10R 31/08
(52) U.S. Cl. ...................................... 370/248; 709/224
(58) Field of Search ................................ 370/241, 242, 370/243, 244, 245, 250, 251, 252, 310, 310.2, 464, 474, 475; 709/223, 224

(56) References Cited

U.S. PATENT DOCUMENTS

| | | | |
|---|---|---|---|
| 5,697,078 A | * 12/1997 | Peterson et al. | ......... 455/190.1 |
| 6,067,297 A | * 5/2000 | Beach | ........................ 370/389 |
| 6,363,384 B1 | 3/2002 | Cookmeyer, II et al. | ..... 707/10 |
| 6,396,287 B1 | 5/2002 | Kapetanic et al. | .......... 324/623 |
| 6,463,271 B1 | * 10/2002 | Schroeder et al. | .......... 455/561 |
| 6,483,814 B1 | * 11/2002 | Hsu et al. | .................... 370/277 |
| 6,526,044 B1 | 2/2003 | Cookmeyer, II et al. | ... 370/352 |
| 6,529,954 B1 | 3/2003 | Cookmeyer, II et al. | ... 709/224 |
| 6,549,862 B1 | * 4/2003 | Huang et al. | .................. 702/77 |
| 6,640,253 B2 | * 10/2003 | Schaefer | ...................... 709/248 |
| 6,665,269 B1 | * 12/2003 | Schmitz | ...................... 370/251 |
| 6,675,203 B1 | * 1/2004 | Herrod et al. | .............. 709/217 |
| 2002/0186660 A1 | 12/2002 | Bahadiroglu | ................ 370/248 |

OTHER PUBLICATIONS

"AiroPeek Wireless Protocol Analyzer," 4 pages: WildPackets, Inc.; Walnut Creek, CA 94596.
"AiroPeek for Windows Quick Tour", 26 pages; 1989–2001; WildPackets, Inc.; Walnut Creek, CA 94596.

* cited by examiner

Primary Examiner—Kenneth Vanderpuye
Assistant Examiner—Ricardo M. Pizarro
(74) Attorney, Agent, or Firm—Silicon Valley IP Group, PC; Kevin J. Zilka; Christopher J. Hamaty

(57) ABSTRACT

An analyzer for a wireless network is configured for surfing a plurality of channels, each for an individually selectable period of time, for monitoring each channel to obtain packet information for analysis, to detect any defects in communication over each respective channel.

30 Claims, 25 Drawing Sheets

CHANNEL SURFING SETTINGS

| CHANNEL ENABLE | SURF TIME (SEC) | CHANNEL ENABLE | SURF TIME (SEC) |
|---|---|---|---|
| #1 | 3 | #8 | 3 |
| #2 | 3 | #9 | 3 |
| #3 | 10 | #10 | 3 |
| #4 | 3 | #11 | 3 |
| #5 | 3 | #12 | 3 |
| #6 | 3 | #13 | 3 |
| #7 | 3 | #14 | 3 |

OK    CANCEL

FIG. 2

GLOBAL STATISTICS

| | PACKETS | OCTETS | ERRORS | 1MB | 2MB | 5.5MB | 11MB | DATA | CND | MGMT | BEACON | SIG... | BSSID |
|---|---|---|---|---|---|---|---|---|---|---|---|---|---|
| CH #1 | 69 | 4912 | 21 | 54 | 0 | 0 | 15 | 0 | 0 | 48 | 48 | 16% | 3COM 013971 |
| CH #2 | 0 | 0 | 0 | 0 | 0 | 0 | 0 | 0 | 0 | 0 | 0 | 0% | * |
| CH #3 | 188 | 12807 | 3 | 96 | 88 | 0 | 4 | 3 | 5 | 177 | 177 | 32% | INTEL 0528F0 |
| CH #4 | 10 | 738 | 5 | 6 | 4 | 0 | 0 | 0 | 0 | 5 | 5 | 35% | * |
| CH #5 | 124 | 9243 | 22 | 73 | 20 | 15 | 16 | 9 | 16 | 77 | 73 | 32% | HOMEWLEFO |
| CH #6 | 81 | 6547 | 7 | 75 | 6 | 0 | 0 | 16 | 1 | 57 | 57 | 35% | 3COM 94884E |
| CH #7 | 649 | 45838 | 6 | 501 | 148 | 0 | 0 | 142 | 0 | 501 | 501 | 35% | ANICOMDED9... |
| CH #8 | 1 | 67 | 0 | 1 | 0 | 0 | 0 | 0 | 0 | 1 | 1 | 32% | * |
| CH #9 | 0 | 0 | 0 | 0 | 0 | 0 | 0 | 0 | 0 | 0 | 0 | 0% | * |
| CH #10 | 94 | 7289 | 0 | 0 | 94 | 0 | 0 | 19 | 0 | 75 | 75 | 19% | LUCENT062CA5 |
| CH #11 | 0 | 0 | 0 | 0 | 0 | 0 | 0 | 0 | 0 | 0 | 0 | 0% | * |
| CH #12 | 0 | 0 | 0 | 0 | 0 | 0 | 0 | 0 | 0 | 0 | 0 | 0% | * |
| CH #13 | 0 | 0 | 0 | 0 | 0 | 0 | 0 | 0 | 0 | 0 | 0 | 0% | * |
| CH #14 | 0 | 0 | 0 | 0 | 0 | 0 | 0 | 0 | 0 | 0 | 0 | 0% | * |

SIZE DIST. / UTILIZATION DIST. / CHANNEL SURFING

FIG. 3

METHOD AND APPARATUS FOR MONITORING DIFFERENT CHANNELS IN AN IEEE 802.11 WIRELESS LAN

RELATED APPLICATION

This Application is related to Ser. No. 09/875,544, filed Jun. 6, 2001, for "Method and Apparatus For Filtering That Specifies The Types Of Frames To Be Captured And To Be Displayed For An IEEE 802.11 Wireless LAN," the teachings of which one incorporated herein to the extent they do not conflict herewith. The related Application, and the present Application have the same Assignee.

FIELD OF THE INVENTION

The present invention relates generally to computerized communication networks for permitting computers to communicate with each other in an organized manner, and more particularly to a network troubleshooting tool for detecting, and diagnosing network failures, and providing a general overview of active communications in the spectrum of allowed frequency channels of IEEE 802.11b or all allowed multiplexed communication channels in general.

BACKGROUND OF INVENTION

Over recent years, the wireless communication field has enjoyed tremendous growth and popularity. Wireless technology now reaches or is capable of reaching nearly every place on the face of the earth. Millions of people exchange information every day using pagers, cellular telephones, and other wireless communication devices. With the success of wireless telephony and messaging services, wireless technology has also made significant inroads into the area of personal and business computing. Without the constraints imposed by wired networks, network users can move about almost everywhere without restriction and access a communication network from nearly any location, enabling wireless transmission of a variety of information types including data, video, voice and the like through the network.

Different radio technologies are used to transmit wireless information. Wireless local area networks are most often using methods described in the IEEE 802.11 specification. The goal is to make certain radio channels shareable for many users, but also not to cause problems by overlapping signals, which disturb other communications using other channels but the same modulation types. Presently, three technologies are most common. These are Frequency Hopping Spread Spectrum, Direct Sequence Spread Spectrum, and Orthogonal Frequency Division Multiplexing. IEEE 802.11 describes both technologies and their usage in Wireless LAN environments. Channel Surfing, as described herein, presently operates with Direct Sequence Spread Spectrum, but the general idea is adaptable to other technologies, which also use some type of channels, modulations or patterns to build several logical channels, which allow users to communicate wirelessly.

Direct Sequence Spread Spectrum, as described in IEEE 802.11b can use up to 14 channels, which are located close to each other between 2.4 and 2.4835 GHz. Table 1 shows an overview of all channel numbers and their frequency. Different countries only allow different channels to be used, because of possible interference with existing radio equipment.

TABLE 1

DSSS Channels

| Channel No. | Frequency (GHz) |
|---|---|
| 1 | 2.412 |
| 2 | 2.417 |
| 3 | 2.422 |
| 4 | 2.427 |
| 5 | 2.432 |
| 6 | 2.437 |
| 7 | 2.442 |
| 8 | 2.447 |
| 9 | 2.452 |
| 10 | 2.457 |
| 11 | 2.462 |
| 12 | 2.467 |
| 13 | 2.472 |
| 14 | 2.484 |

An IEEE 802.11 network can run in two difference modes. One is called "infrastructure mode". This in the most important one. Access points act as bridge devices between a wired network and wireless stations. The other mode is called "ad-hoc mode" and is used for peer-to-peer networking between wireless stations without an access point.

The focus of the invention is set on the infrastructure mode, but the concept will work in general. When setting up a wireless LAN infrastructure, all areas need to be covered by access point radio frequency (RF) signals. Every channel, which offers a maximum speed of 11 Mbit/sec, can only handle a certain number of clients. Each access point interface operates on a single channel. The working distance between an access point and a wireless station is limited from about 30 to 300 feet, depending upon the local environment (e.g. walls and other RF absorbing materials). Many access points are needed to fully cover an area with wireless access. Access points, which use the same frequency channel, and are close together, share the same segment and bandwidth. Neighboring channels interfere with each other since the signals are not perfect. There are only three totally nonoverlapping channels, which are 1, 6, and 11. Other channels can be used, if there is enough dead space in the specific local environment.

SUMMARY OF THE INVENTION

When performing network analysis in a wireless network environment, it is important to quickly obtain a good overview of the whole local environment. Channel surfing provides a method for efficiently retrieving all information needed to understand the entire wireless environment. The present method of analysis can be utilized in general by any device able to capture network traffic from a wireless environment. The present channel surfing invention is implemented in a Network Associates, Inc. product called Sniffer® Wireless. The Sniffer® Wireless is based on the well known and award winning Sniffer® product, which was formerly owned by Network General.

As previously indicated, IEEE 802.11b based traffic can be sent through up to 14 different channels, which are described by the frequency they are using (see Table 1). When doing network analysis in these environments, the best way to start is to look at every single channel and observe the traffic which is seen on this specific channel. Channel surfing describes the way to do it and also how to efficiently present this data to the network manager.

A screen called "Channel Surfing Settings", as shown in FIG. 2, is used to setup the requested behavior. The network manager can specify which channels to monitor, and the time period the Analyzer will monitor a channel before moving to the next one. The process starts with the lowest numbered channel selected and continues to the next higher channel selected. When the highest channel selected is finished being monitored, the process starts again with the lowest numbered channel. A selected background process will instruct the NIC (Network Interface Card) to change the channel when the current channel timer expires. All other processes running in the analyzer can start or stop or even continue what they are doing when surfing is active. An indicator on the screen tells the network manger that channel surfing is on, and the channel currently selected.

A capture process, for example, will continue without interruption. It will capture data from all channels, which were selected and accessed during the capture. Very often the network manager needs to capture traffic from a certain station, which is either identified by its DLC-address, IP-address or associated protocol. Triggers can be used to stop the surfing mode and to stay on a specific channel for capturing data, if a specific frame, which occurred during surfing on different channels was observed. This is not a perfect solution, but still a best effort solution, since a single radio device can only receive a signal from one channel at one time.

Channel surfing can also run in an enhanced mode with two NICs. One is running in channel surfing mode, and observes several channels one after the other. A second NIC is used for capturing. As a result, the process which runs the channel surfing can trigger a capture on the second NIC. A specific channel gets selected, and a capture process starts. Channel surfing goes on. If the same trigger statement becomes true on another channel, the second NIC will continue the capture process, but continue it on the new channel. This solution can address some problems with wireless roaming, where some stations change their access point association during the time period of wireless roaming.

A second key item is the presentation of channel surfing statistics. A single view should offer as much information as possible in some easy manner. A matrix display is the preferred textual display (see FIG. 3). Every channel is represented by one line. For every channel, the important values are printed in separate columns. These are counts for packets, bytes of data, management packets and control packets. More details of the meaning and of these three categories can be found in the IEEE 802.11 MAC description. It is also important to count and show the number of packets observed per a given bit rate or speed. CRC errors and retries are useful indicators for poor radio quality and delays on the network. Other valuable information are the access points, which are seen on every channel. An access point can be identified by sending out beacon frames. These frames are typically sent every 100 msec. In one embodiment the last observed access point is shown. In a preferred embodiment, a list of observed access points per channel is shown to provide more useful information.

Instead of a matrix display, the user can also select any type of data and present it in some graphical format, such as simple bar or line charts. An enhanced display will present a 3-dimensional graph. It may show from front to back the different types are shown or vice versa. Scaling of the values can be either linear or logarithmic. FIG. 4 shows an example of a 3-D graphical presentation.

All the information gathered by channel surfing can also be dumped on disc to allow some interesting long term analysis and trending. These are only statistical snapshots, not full time monitoring information of all channels, but they still provide valuable information about the network behavior.

BRIEF DESCRIPTION OF THE DRAWINGS

Various embodiments of the present invention are described herein with reference to the drawings, in which like items are identified by the same reference designation, wherein:

FIG. 2 shows an example of a computer display of a "Channel Surfing Settings" menu for one embodiment of the invention;

FIG. 3 shows an example of a computer display of a table resulting from "Channel Surfing" for an embodiment of the invention;

DETAILED DESCRIPTION OF THE INVENTION

Figure 1:
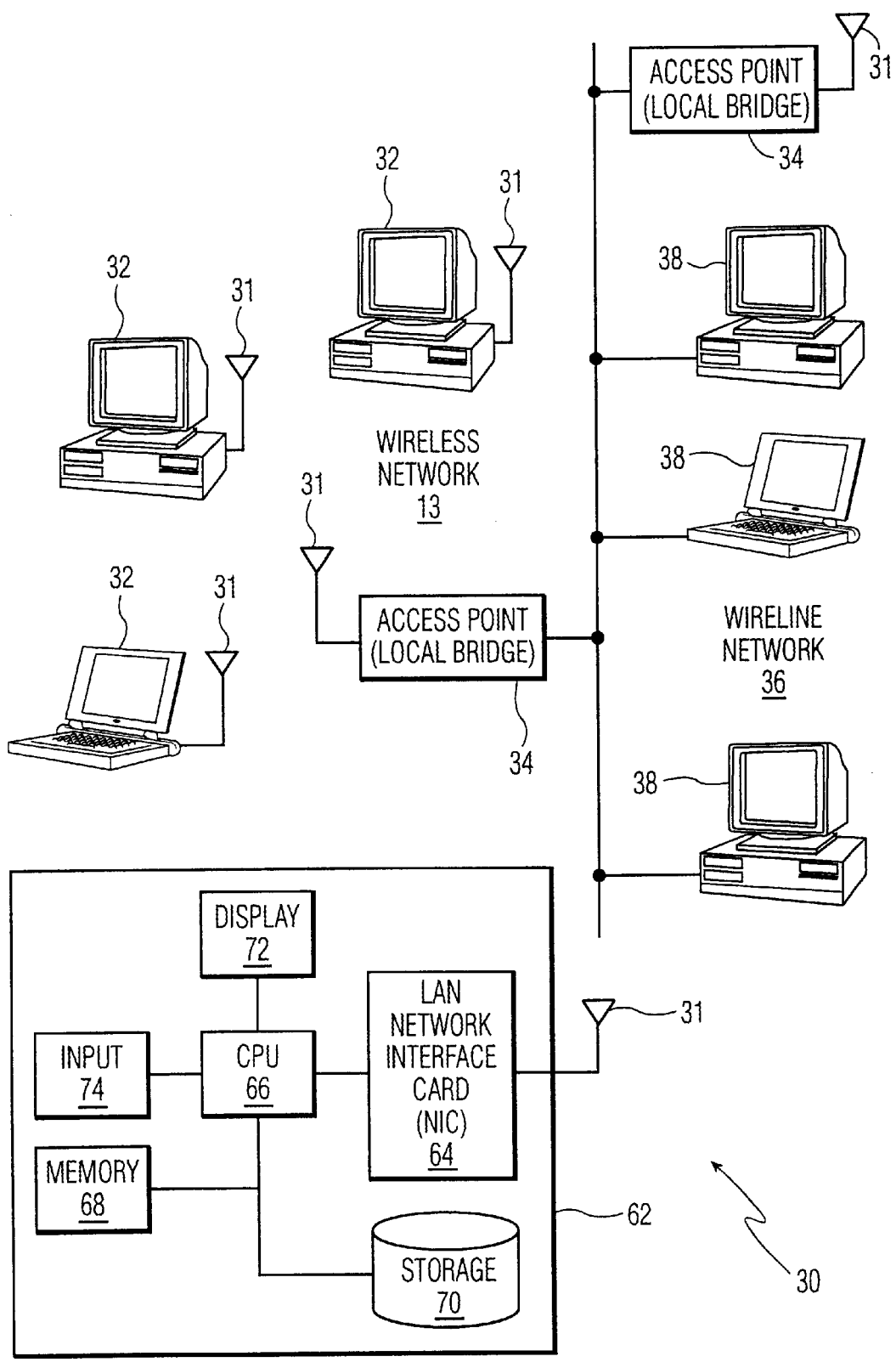
FIG. 1 shows a block schematic diagram of a computer network comprising a wireline network in communication with an IEEE802.11 wireless Media Local Area Network (LAN)

With reference to FIG. 1, one configuration of a LAN-based communication network 30 is shown. The network 30 comprises a plurality of wireless stations 32, and one or more wireless local bridges or access points 34 connected to a wireline network 36 of a plurality of wired stations 38. Each of the wireless stations 32 include a wireless network interface device 31 for interfacing with other wireless stations 32 and with an access point 34 to form a wireless network 33. Such a wireless network interface device, for example, is a Cisco Aironet Series 340 or Series 350 Wireless LAN Adapter, Cisco Systems, San Jose, Calif., or is a Symbol Technologies Spectrum 24 High Rate Adapter LA-4121-1020US. The wireless network interface device 31 transmits the digital signal from the wireless stations 32 to the wireless medium to enable efficient transfer between a sending station and a receiving station, typically in the form of RF signals. The access point(s) 34 enables communication between the wireless network stations 32 and the wired network stations 38, thereby expanding the associated LAN's capability. Information, control signals and other forms of digital data can be transmitted between stations 32 and 38 in the form of discrete data frames via network 30. The data frames, as one skilled in the art will recognize, are provided in a specific format commonly used in the transmission of data through the network 30.

A wireless network monitoring tool 62 of the present invention includes a wireless network interface device 31 connected to a wireless LAN network interface card (NIC) 64 for creating a connection with the LAN 30 so as to determine the topology of the LAN 30 and to monitor other network functions and data frame transmissions. The monitoring tool 62 further includes a processing unit or CPU 66 to receive information regarding the operation of the network 30. A memory 68 and a storage device 70 are connected to the processor 66 to provide temporary and permanent storage, respectively, of information required by the processor 66. A display unit 72 is connected to the processor 66 so as to display, generally in graphic form, information about the network 30 including its topology, data traffic stream, and functions and services. Through input devices 74 such as a keyboard, a mouse and the like, connected to the processor 66, and through a graphical user interface, a user can perform various analysis of the network 30 and monitor data transmissions, as will be described in detail below. The display unit 72, the input devices 74, and the graphical user interface is collectively referred to as a user interface system. The monitoring tool 62 can be considered just another station in the wireless network, similar to the workstations, printers, storage devices, servers, and so forth, but it runs in a promiscuous mode, which will enable it to receive and analyze the packets sent to other stations as well.

The graphical user interface is preferably executed on a processor 66 such as that of a Sniffer® Wireless monitoring tool 62, for example, which is capable of supporting at least one of Windows NT 4.0, Windows 98SE, or Windows 2000 Professional. However, any one of a number of commercial or proprietary processors may be used. Note that in the Sniffer® Wireless, the processor 66 requires a minimum of 128 MB (Megabytes) of RAM, 256 MB (Megabytes) of Swap Space, and 64 MB (Megabytes) of available disk drive space. The present invention may be built using available components or modules.

For the purposes of this invention, a frame represents a discrete logical unit of data transmitted through a communications network or channel from a sender station to a receiving station. The data is commonly a fragment of a much larger set of data, such as a file of text or image information. As the larger file is prepared for transmission, it is fragmented into smaller data units. Each fragment of data is packaged into a frame format, which comprises a header, payload, and trailer. The header prepends the payload and includes a set of framing bits, which are used for purposes of frame delineation and synchronization of the receiving station with the speed of transmission across the transmission link. Also included in the header are routing control information, and address information. Following the header is the payload, which contains the data unit being transmitted. Appending the payload is the trailer, which comprises data bits used for error detection and correction, and a final set of framing bits, or ending flag for purposes of frame delineation. The frame format of a frame is specific to the data communications protocol (i.e., IPX, IP, LLC, SNAP, etc.) being utilized in the network. The present invention is described in correspondence with the frame format used in IEEE802.11 LANs, although it will be understood that the present invention may also be modified for use in connection with other types of frame formats and data communications protocols.

Figure 4:
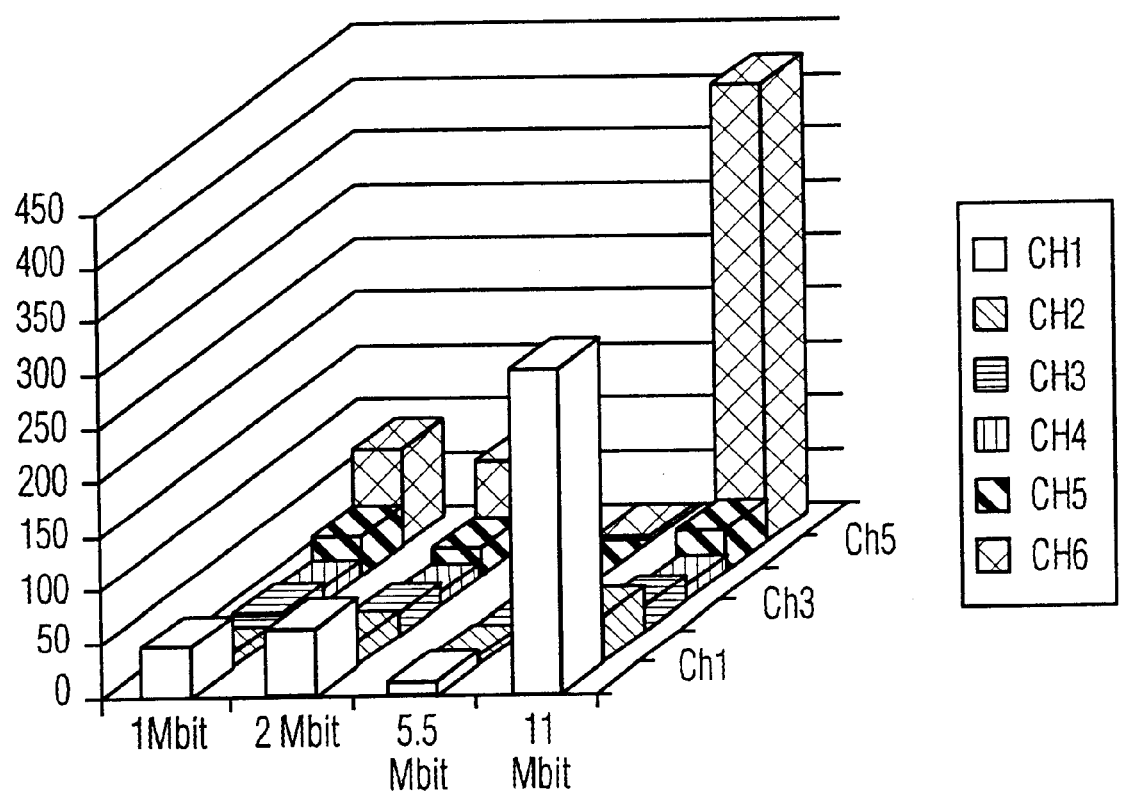
FIG. 4 shows an example of a computer display of a graphical presentation of statistics obtained via channel surfing for an embodiment of the invention.
Figure 5A:
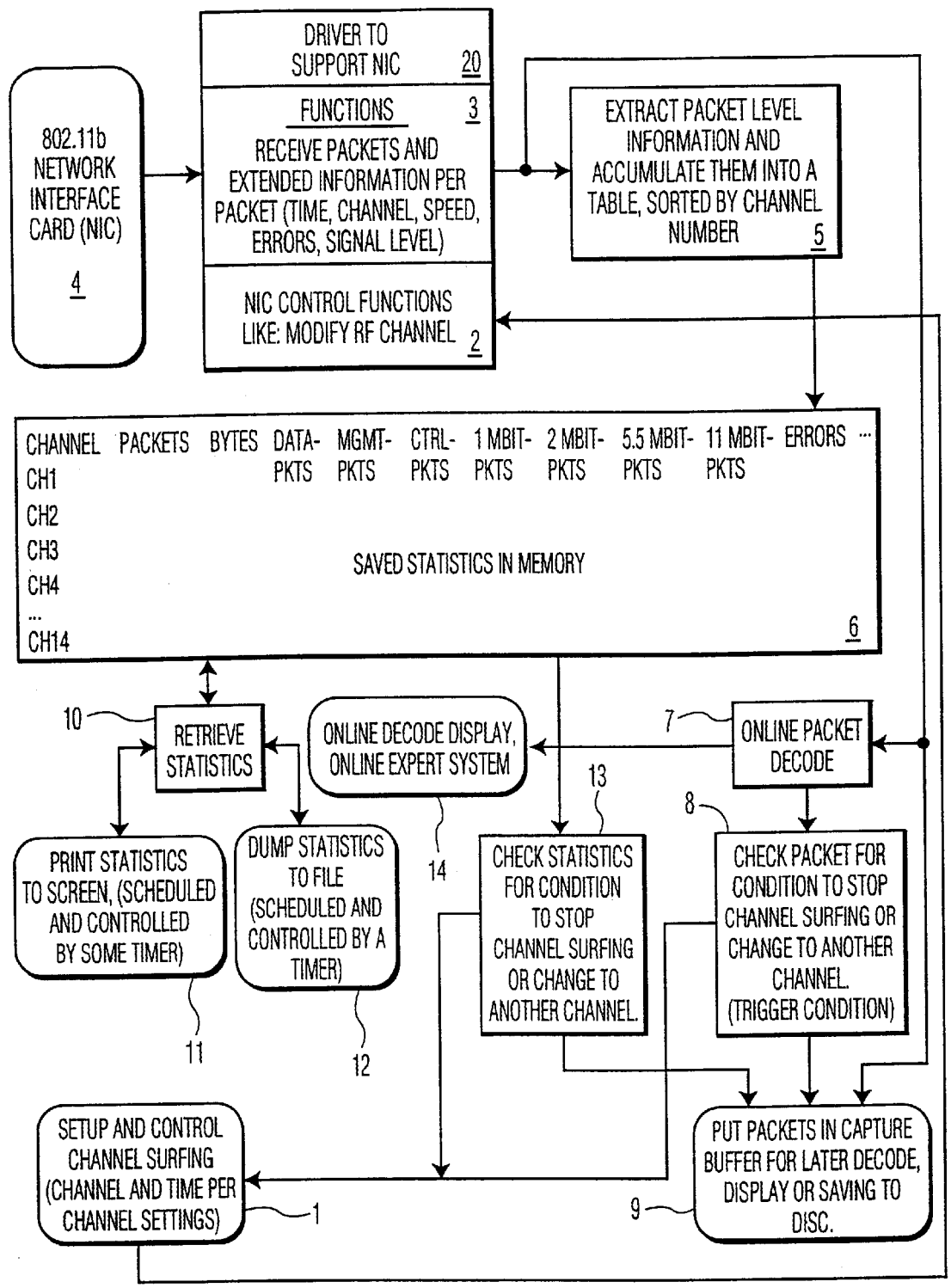
FIG. 5A shows a simplified combined block schematic diagram and flowchart of an example of an embodiment of the invention for incorporating Channel Surfing into an Analyzer for IEEE Wireless 802.11b LANs.

The following description is made with reference to FIG. 5. Assume that a user has access to a known IEEE 802.11b analyzer, which can be programmed to provide Channel surfing embodiments of the present invention. An example of such an Analyzer is a "Sniffer® Wireless" manufactured by Network Associates, Inc, Santa Clara, Calif. The Sniffer® Wireless includes a microprocessor that is programmed to carry out the steps of FIG. 4, and a radio receiver for receiving the RF signals for each channel. In a first step the user must setup the system to operate in a desired manner. The setup is described first below. Next, the manner in which wireless traffic is received, and then forwarded to the different functional blocks of the analyzer is described.

The user defines the time the system will spend on every channel to retrieve packets. A sample screen from a Sniffer® Wireless providing monitoring tool 62 is shown in FIG. 2. The function itself is implemented as shown in FIGS. 3 and 4. More specifically, the user, such as a network manager, selects each channel desired for channel surfing, and the time the analyzer is to remain on each channel for analyzing traffic flow, for example. To do this, with reference to FIG. 1, the user moves a cursor via a computer mouse to each desired channel, clicks the mouse to make the selection, and then moves the cursor to each selected channel's "Surf Time" slot, and types in the time. "OK" is addressed to secure each channel selected and each surf time selected. "Cancel" is addressed to cancel a particular setting.

A number of advanced features can be provided as options. For example, if a trigger occurs during the surfing period, the current channel being monitored will remain selected. Stay on the present channel until a stop trigger condition becomes true. A trigger is an event on the network, which for example can cause an analyzer to start or stop a trace. These trigger events are controlled in either blocks or steps 13 or 8, which send information to the Channel Surfing Control 1.

Two different type of events can cause a trigger. There can be other events like external trigger through a Com port, an SNMP trap or a specific program, which can also interact with the Sniffer®.

More specifically, step 13 is based on a trigger, which checks the statistics saved in memory 6 for some exceeded threshold. These can be absolute or relative values, which exceeded a predetermined value for a certain time. A complex state-machine can be programmed to calculate the event of a trigger. A simple example: Stop channel surfing and save a trace with 1 minute of data, if a broadcast rate of 100 packets/sec occurs on a certain channel. A predetermined time later, continue Channel surfing and wait for the next event.

Step 8 present a trigger event, which is caused by a certain packet or payload within a packet. As previously indicated, a complex state machine can be programmed to cause the trigger to raise. A simple example: Stop channel surfing and save a trace with 10 minutes of data, if station A sends a packet of type HTTP to server B. A predetermined time later move on with Channel surfing and wait for the next event.

Both type of events presented in steps 8 and 13 can also be used as a complex and merged event to trigger an action. They forward required actions not only to function or step 1, but also to step 9, which represents all packet capture functions such as starting, stopping and saving traces.

Step 1 programming also controls the timing for the channel surfing. Whenever a time interval has expired, and no other event prevents changing a channel, it will send a command to the control portion 2 of the NIC driver 20 to change the channel register in the Network Interface Card (NIC) 4. IEEE 802.11b uses DSSS (Direct Sequence Spread Spectrum), where a channel change can be easily and quickly changed (like changing the channel on a radio). During the short time period when changing the channel the service to forward packets from the NIC 4 to the driver 20 for function or step 3 may be stopped. However, this will depend on the specific features NIC 4 supports.

The wireless NIC 4 receives radio signals at the channel or frequency selected. The internal demodulation tries to create valid network traffic patterns. A wireless NIC, which operates as a part of an analyzer, will only receive and not sent any traffic. This is a general limitation of a radio. A system with one tuner can only receive or send data at any given time.

Presently, wireless NICs send and receive traffic, which is embedded in the IEEE 802.11 protocol. Operating systems such as Windows don't recognize this protocol. The NIC control 2 or the driver function 3 modifies this data to some standard IEEE 802.3 or Ethernet packet, which is recognized by the operating system. All packets which arrive and are somehow damaged (example: bad CRC or cyclic redundancy check) are dropped by the driver function 3 to avoid problems on the next functional level. This is not an ideal way to use an analyzer. It is important to see as much information as possible, including damaged packets.

Some general modifications, which need to be accomplished to modify a standard NIC and its driver to operate as an analyzer for IEEE 802.11 will now be described. The modifications are made in driver 20 and require changes in the capture function 3 thereof.

Every packet must include the original IEEE 802.11 header, and all upper layer protocol data inside this header. A specific header for every frame includes additional information. These are:

(1) flags for several error-conditions;
(2) timestamp of packet arrival;
(3) radio channel where the frame was captured;
(4) speed with which the packet was transmitted; and
(5) signal level or strength of the packet, which was received.

This full set of information, which includes the specific header and the entire data-packet, can now be processed by different modules. In this scenario, the system has a statistic module 5, which is dedicated to specific wireless statistics, and a decode module 7, which creates online packet decodes. This decode information, can be used as an input for other modules like the trigger checking module 8 or some modules, which for example do online decode display or online Expert System 14. This so called Expert System 14 is provided in the Sniffer® Wireless Analyzer mentioned above.

The statistic module 5 observes every single packets's wireless specific information, and puts this data in a statistics table, which is kept in memory, this table is optimized for channel surfing purposes. This means that every line is related to one specific channel. If Frequency hopping systems (FHSS=Frequency Hopping Spread Spectrum) are utilized, which are defined in IEEE 802.11, every line will belong to one specific hopping pattern.

A different counter is dedicated in each channel for storing the values for wireless characteristics of the associated channel. These values as counted by an individual counter per channel are:

packets;
bytes;
error packets;
WEP packets;
retry packets;
data packets;
broadcast packets;
multicast packets;
management packets; and
control packets.

Packets can also be separated by their transmit speed, as follows:

packets transmitted with 1 Mbit/sec;
packets transmitted with 2 Mbit/sec;
packets transmitted with 5.5 Mbit/sec; and
packets transmitted with 11 Mbit/sec.

This list can be made more complex. Management and control packet types can be separated by their different types. All of these are described in the IEEE 802.11 specification.

These types can then be counted on a per transmit speed basis. This basically opens a third dimension for the tables in memory (channels, speeds, different types of packets values).

Some examples are:
broadcast frames (data frame type) with 2 Mbit/sec;
beacon frames (management frame type) with 1 Mbit/sec; and
error frames (any frame type) with 11 Mbit/sec.

This invention focuses on the general, fast and easy visibility of wireless network traffic in different channels. So the idea must be to gather these statistics and present them in some simple manner to the network manager. The focus should not be on every single one of the values, but more in the concept of visibility. Some sample screen-output, which can be generated by steps or blocks 10 and 11, is shown in FIG. 3. The focus is on the general traffic understanding. As an other example, FIG. 3 shows a graphical display of packets per speed and per channel. The user can also use other tables, Online Expert 14 or standard packet capture to get different, greater and deeper visibility.

Step 10 retrieves statistics from memory 6, for printing and/or display in Step 11, or dumping into a file via Step 12. The data is dumped for reporting and documentation issues on some regular time interval to disc. This allows permanent 24-by-7 reporting.

The interface 13 is between the statistics saved in memory 6 and the channel surfing control 1. This works similar to module block 8. In interface 13, the system checks against a threshold, which the network manager previously setup. Whenever such a threshold is exceeded surfing control, 1 gets information about new actions. These actions are:

A. Stop channel surfing and stay on the current channel.
B. Move on with channel surfing.

At the same time the capture engine can be programmed to start or stop a capture and save a trace to disc. This is indicated in the relation between Steps 13 and 8 to the packet capture Step 9.

In the use of the method of the invention, a network manager obtains the best overall visibility in his/her wireless IEEE 802.11b network by using a standard Network Interface Card 4. This is the first step for effective analysis and troubleshooting in wireless network.

Greater details relative to statistics gathering implementation of the present invention, will now be provided relative to the Sniffer® Wireless product. In an 802.11 network, there are several frame types and frame attributes for all packets sent in an 802.11 Wireless Network. The Sniffer® Wireless product is capable of promiscuous mode network analysis of a wireless LAN 13. As such it receives all data within a wireless LAN 13 and can apply specific algorithms to report information regarding the status of that network. The specific frame types and attributes are measurable within a wireless LAN 13.

Figure 5B:
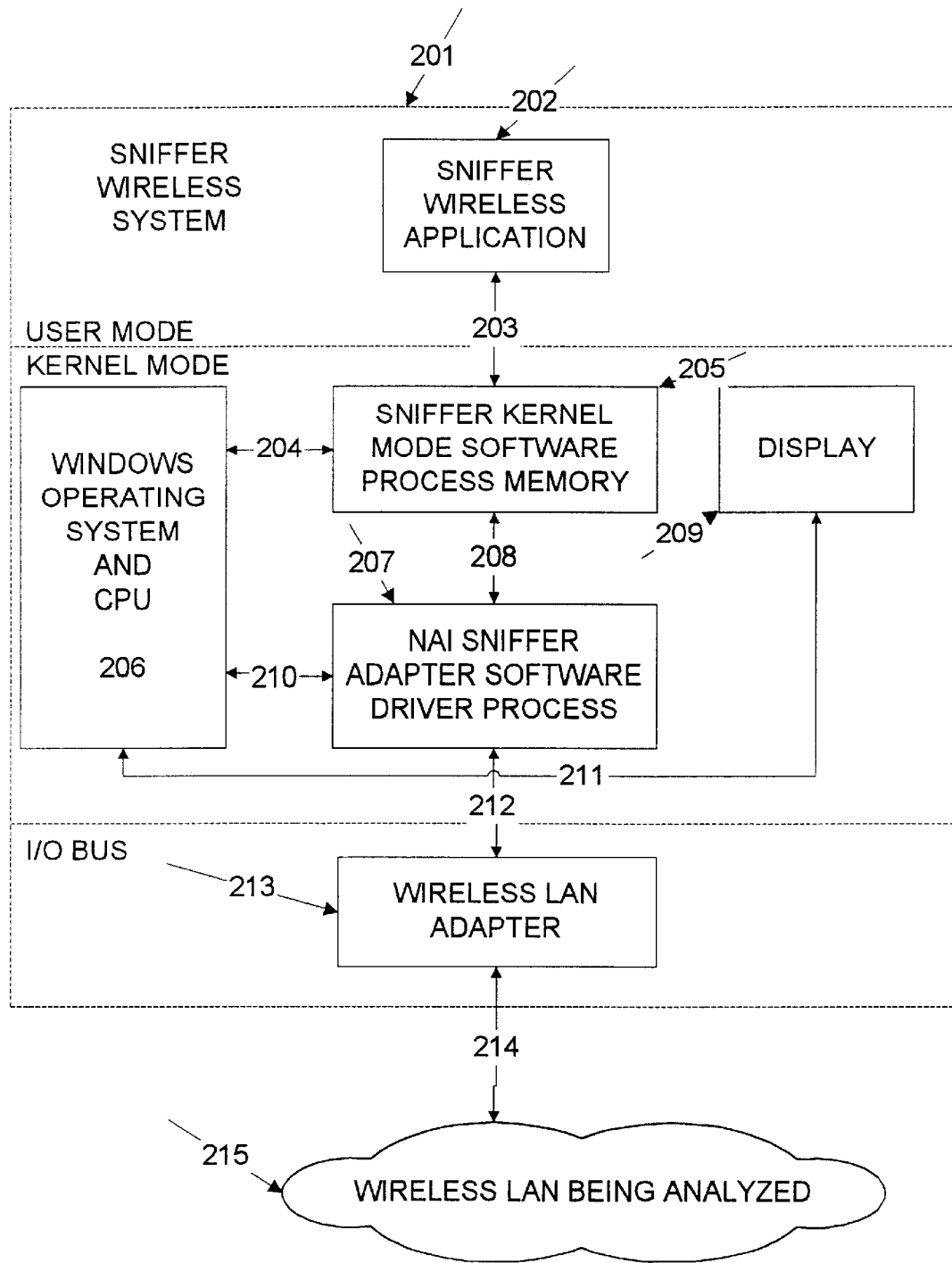
FIG. 5B shows a block schematic diagram of a Sniffer® Wireless system.

A block diagram of a Sniffer® Wireless System 201 is shown in FIG. 5B. As shown, a Wireless LAN 215 that is being analyzed by the Sniffer® Wireless 201 via typically RF Signals 214 received by a Wireless LAN adapter 213. The wireless LAN adapter 213 converts the RF signals to electrical signals, and they are connected via a bus or cable 212 to a driver 207. The hardwire connection 208 connects the driver 207 to memory 205, and via another bus or wired connection 210 to a central processing unit (CPU) 206. The "Sniffer® Kernel Mode Software Process Memory" 205 is also connected via a bus or cable connection 203 to a "Sniffer® Wireless Application" 202. The CPU 206 drives a display 209 for presenting processed frame information to a user, as will be explained. Note that as shown, the "Sniffer® Wireless Application" 202 operates in a "user mode", which is a non-privileged processor mode that applications typically run in. This mode limits the set of available interfaces, and also limits access to system data. Contrary to this, the combination of the CPU 206 and "Sniffer® Kernel Mode Software Process Memory" 205, driver 207, and display 209, are operated in a "kernel mode", which is a privileged mode of code execution via CPU 206, in which the contents of memory of 205 are totally accessible, and all CPU 206 instructions are permitted to be issued. In other words, the operating system code, including system services and device drivers, are run in a kernel mode.

The IEEE Specification for 802.11 and 802.11b networks defines specific frame types. The following Table 2 identifies these frame types and their meaning as specified.

TABLE 2

IEEE 802.11 And 802.11b Frame Types

| Frame Type | Frame Sub Type | IEEE Specification Location |
| --- | --- | --- |
| CONTROL | ACK | [1] IEEE 7.2.1.3 |
|  | CTS | [1] IEEE 7.2.1.2 |
|  | RTS | [1] IEEE 7.2.1.1 |
|  | PS-POLL | [1] IEEE 7.2.1.4 |
|  | CF-END | [1] IEEE 7.2.1.5 |
|  | CF-END/CF-ACK | [1] IEEE 7.2.1.6 |
| MANAGEMENT | ASSOCIATION REQUEST | [1] IEEE 7.2.3.4 |
|  | ASSOCIATION RESPONSE | [1] IEEE 7.2.3.5 |
|  | REASSOCIATION REQUEST | [1] IEEE 7.2.3.6 |
|  | REASSOCIATION RESPONSE | [1] IEEE 7.2.3.7 |
|  | PROBE REQUEST | [1] IEEE 7.2.3.8 |
|  | PROBE RESPONSE | [1] IEEE 7.2.3.9 |
|  | BEACON | [1] IEEE 7.2.3.1 |
|  | ATIM | [1] IEEE 7.2.3.2 |
|  | DISASSOCIATION | [1] IEEE 7.2.3.3 |
|  | AUTHENTICATION | [1] IEEE 7.2.3.10 |
|  | DEAUTHENTICATION | [1] IEEE 7.2.3.11 |
| DATA | DATA | [1] IEEE 7.2.2 |

The IEEE specifications for 802.11 and 802.11b define specific attributes of frames transmitted on a specific network. The Sniffer® Wireless 201 can receive this data and classify received frame information. The frame attributes are defined in Table 3, as follows:

TABLE 3

Definitions for Frame Attributes

| Frame Attribute | Description | IEEE Specification |
| --- | --- | --- |
| (First Portion) | | |
| Retry | The 802.11 MAC Header contains a bit in the Frame Control Field indicating that the current frame was resent by the transmitter due to a failure to receive an acknowledgement from the receiving station. | [1] 7.1.3.1.6 |
| WEP | The 802.11 MAC Header contains a bit in the Frame Control Field indicating that the current frame data field is encrypted using WEP encryption. | [1] 7.1.3.1.9 |
| Order | The 802.11 MAC Header contain a bit in the Frame Control Field indicating that the current frame belongs in the strictly ordered class. | [1] 7.1.3.1.10 |

TABLE 3-continued

Definitions for Frame Attributes

| Frame Attribute | Description | IEEE Specification |
|---|---|---|
| Short PLCP | The 802.11 specification indicates that a preamble field shall be transmitted prior to transmitting packet data. This preamble/PLCP contains a specific pattern useful for receiver synchronization. The 802.11b specification offers the option that stations can transmit a shorter preamble/PLCP header. The duration of this shorter preamble/PLCP header occupies 96 microseconds of link. | [2] 18.2.2.2 |
| Long PLCP | The 802.11 specification indicates that a preamble field shall be transmitted prior to transmitting packet data. This preamble/PLCP contains a specific pattern useful for receiver synchronization. The original 802.11 specification indicates that the duration of the Long PLCP/preamble occupies 192 microseconds of link. | [2] 18.2.2.1 |

(Second Portion)

| Frame Attribute | Description | IEEE Specification |
|---|---|---|
| 1 Mbps | The 802.11 specification indicates that the PLCP Header of a frame defines the speed at which the data field is transmitted. Under certain RF environment conditions, the transmitter will select which speed to transmit each packet. The available speeds for transmitting the data field of a packet are 1, 2, 5.5 and 11 Mbps. | [2] 18.2.3.3 |
| 2 Mbps | The 802.11 specification indicates that the PLCP Header of a frame defines the speed at which the data field is transmitted. Under certain RF environment conditions, the transmitter will select which speed to transmit each packet. The available speeds for transmitting the data field of a packet are 1, 2, 5.5 and 11 Mbps. | [2] 18.2.3.3 |
| 5.5 Mbps | The 802.11 specification indicates that the PLCP Header of a frame defines the speed at which the data field is transmitted. Under certain RF environment conditions, the transmitter will select which speed to transmit each packet. The available speeds for transmitting the data field of a packet are 1, 2, 5.5 and 11 Mbps. | [2] 18.2.3.3 |
| 11 Mbps | The 802.11 specification indicates that the PLCP Header of a frame defines the speed at which the data field is transmitted. Under certain RF environment conditions, the transmitter will select which speed to transmit each packet. The available speeds for transmitting the data field of a packet are 1, 2, 5.5 and 11 Mbps. | [2] 18.2.3.3 |
| CRC Error | The 802.11 specification indicates that the data field of a 802.11 frame will use a 32 bit Frame Check Sequence field that performs an integrity check on the data field to detect that a receiver has received a frame free of errors. | [1] 7.1.3.6 |

(Third Portion)

| Frame Attribute | Description | IEEE Specification |
|---|---|---|
| PLCP Error | The 802.11 specification indicates that the PLCP field of an 802.11 frame will use a 16 bit Frame Check Sequence field that performs an integrity check on the 4 Byte PLCP header to insure that a receiver has receiver has received a PLCP header free of errors. | [2] 18.2.3.6 |
| WEP ICV Error | The 802.11 specification indicates that when WEP Encryption is used, an Integrity Check Value on the Encrypted data frame be used to insure the integrity of the encrypted payload of that WEP frame. | [1] 8.2.5 |
| PLCP Length Field | The 802.11 specification indicates within the PLCP header the total number of microseconds for which the 802.11 MPDU occupies the link. | [2] 18.2.3.5 |

As previously indicated the Sniffer® Wireless determines information for each frame received, and accumulates statistical information for each RF channel in the Wireless Network 13 being analyzed. The source for this information is provided by analyzing the frame data contents. Other information is provided by the hardware receiving the data frames. The following Table 4 identifies statistical information collected by the application of the invention. Table 4 also identifies the source of this information.

TABLE 4

Statistical Information

| Statistical Information Item | Description | Source of this information | Flowchart Variable Names |
|---|---|---|---|
| | First Portion | | |
| Packets/s | This statistic represents the total number of packets observed by the Sniffer ® Wireless in the previous second. This dial is updated once per second. | Packet Data | PACKETS_PER_SEC [CHANNEL] |
| | (Second Portion) | | |
| Errors/s | This statistic represents the Total number of packets observed by the Sniffer ® Wireless in the previous second which have been received with one of the following errors: CRC, WEP ICV, UNDERSIZE, OVERSIZE or PLCP. | Packet data, packet information or WEP decryption algorithm. | ERRORS_PER_SEC [CHANNEL] |

TABLE 4-continued

Statistical Information

| Statistical Information Item | Description | Source of this information | Flowchart Variable Names |
|---|---|---|---|
| Data Throughput | This statistic represents the total amount of data throughput that has been observed by the Sniffer ® Wireless in the previous second. The data throughput is the total amount of 802.11 packets of 802.11 Type DATA. This statistic is calculated in bits per second. | Packet data. | DATA_THROUGHPUT [CHANNEL] |
| Total Packets Received | This statistic accumulates the total number of all 802.11 frames that have been observed by the analyzer. | Adapter and Software Processing Algorithm | TOTAL_PACKETS [CHANNEL] |
| Total Bytes Received | This statistic accumulates the total number of octets within 802.11 frames that have been observed by the analyzer. | Adapter and Software Processing Algorithm | TOTAL_OCTETS [CHANNEL] |
| Total Drops | This statistic accumulates the total number of packets that could not be observed by the Sniffer ® Wireless because of unavailable buffer space in the adapter. | Adapter | TOTAL_DROPS [CHANNEL] |
| Multicasts | This statistic accumulates the total number of packets observed by the Sniffer ® Wireless to have a Receiver Address whose type is Multi-Cast Address. | Software Processing Algorithm | TOTAL_MULTICASTS [CHANNEL] |

(Third Portion)

| | | | |
|---|---|---|---|
| Broadcasts | This statistic accumulates the total number of packets observed by the Sniffer ® Wireless to have a Receiver Address whose type is the Broadcast Address. | Software Processing Algorithm | TOTAL_BROADCASTS [CHANNEL] |
| Errors | This statistic accumulates the total number of packets observed by the Sniffer ® Wireless which have been received with one of the following errors: CRC, WEP ICV, UNDERSIZE, OVERSIZE or PLCP. | Software Processing Algorithm, packet information or WEP decryption algorithm. | TOTAL_ERRORS [CHANNEL] |
| Network Utilization | This statistic provides a 1 second average of the total amount of time where the 802.11 network was utilized within the previous one second. A definition of network utilization indicates the wireless LAN medium was not IDLE. When there is not packet data occupying the medium, then the wireless LAN medium is considered to be IDLE. | Adapter and Software Processing Algorithm | UTILIZATION [CHANNEL] |
| Errors | This statistic provides the accumulated number of 802.11 frames that have been observed by this analyzer to contain an error of the following type: Undersize, Oversize, CRC, PLCP or WEP-ICV | Software Processing Algorithm | ERRORS[CHANNEL] |

(Fourth Portion)

| | | | |
|---|---|---|---|
| 14–63 Byte Frames | This statistic provides the accumulated number of 802.11 frames that have been observed by the analyzer to have a valid CRC32 field and whose length (included the CRC field) is greater than or | Software Processing Algorithm | TOTAL_14_63_PKTS [CHANNEL] |

TABLE 4-continued

Statistical Information

| Statistical Information Item | Description | Source of this information | Flowchart Variable Names |
|---|---|---|---|
| | equal to 14 bytes and less than or equal to 63 bytes. | | |
| 64–127 Byte Frames | This statistic provides the accumulated number of good 802.11 frames that have been observed by the analyzer to have a valid CRC32 field and whose length (included the CRC field) is greater than or equal to 64 bytes and less than or equal to 127 bytes. | Software Processing Algorithm | TOTAL_64_127_PKTS [CHANNEL] |
| 128–255 Byte Frames | This statistic provides the accumulated number of good 802.11 frames that have been observed by the analyzer to have a valid CRC32 field and whose length (included the CRC field) is greater than or equal to 128 bytes and less than or equal to 255 bytes. | Software Processing Algorithm | TOTAL_128_255_PKTS [CHANNEL] |
| 256–511 Byte Frames | This statistic provides the accumulated number of good 802.11 frames that have been observed by the analyzer to have a valid CRC32 field and whose length (included the CRC field) is greater than or equal to 256 bytes and less than or equal to 511 bytes. | Software Processing Algorithm | TOTAL_256_511_PKTS [CHANNEL] |
| (Fifth Portion) | | | |
| 512–1023 Byte Frames | This statistic provides the accumulated number of good 802.11 frames that have been observed by the analyzer to have a valid CRC32 field and whose length (included the CRC field) is greater than or equal to 512 bytes and less than or equal to 1023 bytes. | Software Processing Algorithm | TOTAL_512_1023 PKTS [CHANNEL] |
| 1024–2047 Byte Frames | This statistic provides the accumulated number of good 802.11 frames that have been observed by the analyzer to have a valid CRC32 field and whose length (included the CRC field) is greater than or equal to 1024 bytes and less than or equal to 2047 bytes. | Software Processing Algorithm | TOTAL_1024_2047_PKTS [CHANNEL] |
| 2048–2346 Byte Frames | This statistic provides the accumulated number of good 802.11 frames that have been observed by the analyzer to have a valid CRC32 field and whose length (included the CRC field) is greater than or equal to 2048 bytes and less than or equal to 2346 bytes. | Software Processing Algorithm | TOTAL_2048_2346_PKTS [CHANNEL] |
| (Sixth Portion) | | | |
| Undersize Frames | This statistic provides the accumulated number of 802.11 frames that have been observed by the analyzer to have a valid CRC32 field and whose length (including the CRC field) is less than 14 bytes. | Software Processing Algorithm | TOTAL_UNDERSIZES [CHANNEL] |
| Oversize Frames | This statistic provides the accumulated number of 802.11 frames that have been observed by the analyzer to have a valid CRC32 field and whose length (including the | Software Processing Algorithm | TOTAL_OVERSIZES [CHANNEL] |

TABLE 4-continued

Statistical Information

| Statistical Information Item | Description | Source of this information | Flowchart Variable Names |
|---|---|---|---|
| | CRC field) is greater than 2346 bytes. | | |
| PCLP Errors | This statistic provides the accumulated number of 802.11 frames that have been observed by the analyzer to have an invalid CRC-16 in the PLCP header. | Adapter | TOTAL_PLCPERRS [CHANNEL] |
| CRC Errors | This statistic provides the accumulated number of 802.11 frames that have been observed by the analyzer to have an CRC in the 802.11 frame. | Adapter and Software Processing Algorithm | TOTAL_CRCS [CHANNEL] |
| (Seventh Portion) | | | |
| WEP-ICV | This statistic provides the accumulated number of 802.11 frames that have been observed by the analyzer to have a valid CRC in the 802.11 frame and to have been encrypted and when decrypted by the analyzer have found to have failed the WEP-ICV check. | Software Processing Algorithm | TOTAL_WEPICVS [CHANNEL] |
| Data Frames | This statistic provides the accumulated number of 802.11 frames that have been observed by the analyzer to have a valid CRC in the 802.11 frame and are of 802.11 frame type DATA. | Software Processing Algorithm | TOTAL_DATA_PKTS [CHANNEL] |
| Management Frames | This statistic provides the accumulated number of 802.11 frames that have been observed by the analyzer to have a valid CRC in the 802.11 frame and are of 802.11 frame type MANAGEMENT. | Software Processing Algorithm | TOTAL_MGMT_PKTS [CHANNEL] |
| Control Frames | This statistic provides the accumulated number of 802.11 frames that have been observed by the analyzer to have a valid CRC in the 802.11 frame and are of 802.11 frame type CONTROL. | Software Processing Algorithm | TOTAL_CTRL_PKTS [CHANNEL] |
| (Eighth Portion) | | | |
| Retry Frames | This statistic provides the accumulated number of 802.11 frames that have been observed by the analyzer where the 802.11 Frame Control Field contains the Retry bit set. | Software Processing Algorithm | TOTAL_RETRY_PKTS [CHANNEL] |
| WEP Frames | This statistic provides the accumulated number of 802.11 frames that have been observed by the analyzer where the 802.11 Frame Control Field contains the WEP Privacy bit set. | Software Processing Algorithm | TOTAL_WEP_PKTS [CHANNEL] |
| Order Frames | This statistic provides the accumulated number of 802.11 frames that have been observed by the analyzer where the 802.11 Frame Control Field contains the Order bit set. | Software Processing Algorithm | TOTAL_ORDER_PKTS [CHANNEL] |
| Data Throughput | Same as Dial | Software Processing Algorithm | DATA_THROUGHPUT [CHANNEL] |
| Short PLCP | This statistic provides the accumulated number of 802.11 | Adapter | TOTAL_SHORT_PLCPS [CHANNEL] |

TABLE 4-continued

Statistical Information

| Statistical Information Item | Description | Source of this information | Flowchart Variable Names |
|---|---|---|---|
| | frames that have been observed by the analyzer where the PLCP is the Short type. | | |
| | (Ninth Portion) | | |
| Long PLCP | This statistic provides the accumulated number of 802.11 frames that have been observed by the analyzer where the PLCP is the Long type. | Adapter | TOTAL_LONG_PLCPS [CHANNEL] |
| 1 Mbps Packets | This statistic provides the accumulated number of 802.11 frames that have been observed by the analyzer where the MPDU portion of the frame was transmitted using the 1 Mbps Barker Code. | Adapter | TOTAL_1MB_PKTS [CHANNEL] |
| 2 Mbps Packets | This statistic provides the accumulated number of 802.11 frames that have been observed by the analyzer where the MPDU portion of the frame was transmitted using the 2 Mbps Barker Code. | Adapter | TOTAL_2MB_PKTS [CHANNEL] |
| 5.5 Mbps Packets | This statistic provides the accumulated number of 802.11 frames that have been observed by the analyzer where the MPDU portion of the frame was transmitted using the 5.5 Mbps CCK or PBCC code. | Adapter | TOTAL_5_5MB_PKTS [CHANNEL] |
| | (Tenth Portion) | | |
| 11 Mbps Packets | This statistic provides the accumulated number of 802.11 frames that have been observed by the analyzer where the MPDU portion of the frame was transmitted using the 11 Mbps CCK or PBCC code. | Adapter | TOTAL_1 1 MB_PKTS [CHANNEL] |
| Association Request Packets | This statistic provides the accumulated number of 802.11 frames that have been observed by the analyzer to have a valid CRC in the 802.11 frame and are of 802.11 frame type MANAGEMENT and 802.11 frame subtype ASSOCIATION REQUEST. | Software Processing Algorithm | TOTAL_ASSOC_REQS [CHANNEL] |
| Association Response | This statistic provides the accumulated number of 802.11 frames that have been observed by the analyzer to have a valid CRC in the 802.11 frame and are of 802.11 frame type MANAGEMENT and 802.11 frame subtype ASSOCIATION RESPONSE. | Software Processing Algorithm | TOTAL_ASSOC_RESP [CHANNEL] |
| | (Eleventh Portion) | | |
| Reassociation Request | This statistic provides the accumulated number of 802.11 frames that have been observed by the analyzer to have a valid CRC in the 802.11 frame and are of 802.11 frame type MANAGEMENT and 802.11 frame subtype REASSOCIATION REQUEST. | Software Processing Algorithm | TOTAL_REASSOC_REQS [CHANNEL] |
| Reassociation Response | This statistic provides the accumulated number of 802.11 | Software Processing | TOTAL_REASSOC_RESP [CHANNEL] |

TABLE 4-continued

Statistical Information

| Statistical Information Item | Description | Source of this information | Flowchart Variable Names |
|---|---|---|---|
| | frames that have been observed by the analyzer to have a valid CRC in the 802.11 frame and are of 802.11 frame type MANAGEMENT and 802.11 frame subtype REASSOCIATION RESPONSE. | Algorithm | |
| Probe Request | This statistic provides the accumulated number of 802.11 frames that have been observed by the analyzer to have a valid CRC in the 802.11 frame and are of 802.11 frame type MANAGEMENT and 802.11 frame subtype PROBE REQUEST. | Software Processing Algorithm | TOTAL_PROBE_REQS [CHANNEL] |

(Twelfth Portion)

| | | | |
|---|---|---|---|
| Probe Response | This statistic provides the accumulated number of 802.11 frames that have been observed by the analyzer to have a valid CRC in the 802.11 frame and are of 802.11 frame type MANAGEMENT and 802.11 frame subtype PROBE RESPONSE. | Software Processing Algorithm | TOTAL_PROBE_RESP [CHANNEL] |
| Beacon | This statistic provides the accumulated number of 802.11 frames that have been observed by the analyzer to have a valid CRC in the 802.11 frame and are of 802.11 frame type MANAGEMENT and 802.11 frame subtype BEACON. | Software Processing Algorithm | TOTAL_BEACONS [CHANNEL] |
| ATIM | This statistic provides the accumulated number of 802.11 frames that have been observed by the analyzer to have a valid CRC in the 802.11 frame and are of 802.11 frame type MANAGEMENT and 802.11 frame subtype ATIM. | Software Processing Algorithm | TOTAL_ATIM [CHANNEL] |

(Thirteenth Portion)

| | | | |
|---|---|---|---|
| Disassociation | This statistic provides the accumulated number of 802.11 frames that have been observed by the analyzer to have a valid CRC in the 802.11 frame and are of 802.11 frame type MANAGEMENT and 802.11 frame subtype DISASSOCIATION. | Software Processing Algorithm | TOTAL_DISASSOC [CHANNEL] |
| Authentication | This statistic provides the accumulated number of 802.11 frames that have been observed by the analyzer to have a valid CRC in the 802.11 frame and are of 802.11 frame type MANAGEMENT and 802.11 frame subtype AUTHENTICATION. | Software Processing Algorithm | TOTAL_AUTH [CHANNEL] |
| Deauthentication | This statistic provides the accumulated number of 802.11 frames that have been observed by the analyzer to have a valid CRC in the 802.11 frame and are of 802.11 frame type MANAGEMENT and 802.11 frame subtype DEAUTHENTICATION. | Software Processing Algorithm | TOTAL_DEAUTH [CHANNEL] |

TABLE 4-continued

Statistical Information

| Statistical Information Item | Description | Source of this information | Flowchart Variable Names |
|---|---|---|---|
| (Fourteenth Portion) | | | |
| PS Poll | This statistic provides the accumulated number of 802.11 frames that have been observed by the analyzer to have a valid CRC in the 802.11 frame and are of 802.11 frame type CONTROL and 802.11 frame subtype PS-POLL. | Software Processing Algorithm | TOTAL_PSPOLL [CHANNEL] |
| RTS | This statistic provides the accumulated number of 802.11 frames that have been observed by the analyzer to have a valid CRC in the 802.11 frame and are of 802.11 frame type CONTROL and 802.11 frame subtype RTS. | Software Processing Algorithm | TOTAL_RTS [CHANNEL] |
| CTS | This statistic provides the accumulated number of 802.11 frames that have been observed by the analyzer to have a valid CRC in the 802.11 frame and are of 802.11 frame type CONTROL and 802.11 frame subtype CTS. | Software Processing Algorithm | TOTAL_CTS [CHANNEL] |
| Acknowledgement | This statistic provides the accumulated number of 802.11 frames that have been observed by the analyzer to have a valid CRC in the 802.11 frame and are of 802.11 frame type CONTROL and 802.11 frame subtype ACK. | Software Processing Algorithm | TOTAL_ACK [CHANNEL] |
| (Fifteenth Portion) | | | |
| CF End | This statistic provides the accumulated number of 802.11 frames that have been observed by the analyzer to have a valid CRC in the 802.11 frame and are of 802.11 frame type CONTROL and 802.11 frame subtype CF-END. | Software Processing Algorithm | TOTAL_CFEND [CHANNEL] |
| CF End/CF Ack | This statistic provides the accumulated number of 802.11 frames that have been observed by the analyzer to have a valid CRC in the 802.11 frame and are of 802.11 frame type CONTROL and 802.11 frame subtype CF-END/CF-ACK. | Software Processing Algorithm | TOTAL_CFEND_CFACK [CHANNEL] |
| BSSID | This value provides the MAC address of the BSS within the Access Point currently observed within a 802.11 frame type MANAGEMENT and frame subtype BEACON. | Software Processing Algorithm | BSSID[CHANNEL] |
| ESSID | This value provides the ESS ID within the Access Point currently observed within a 802.11 frame type MANAGEMENT and frame subtype BEACON. | Software Processing Algorithm | ESSID[CHANNEL] |

Figure 6:
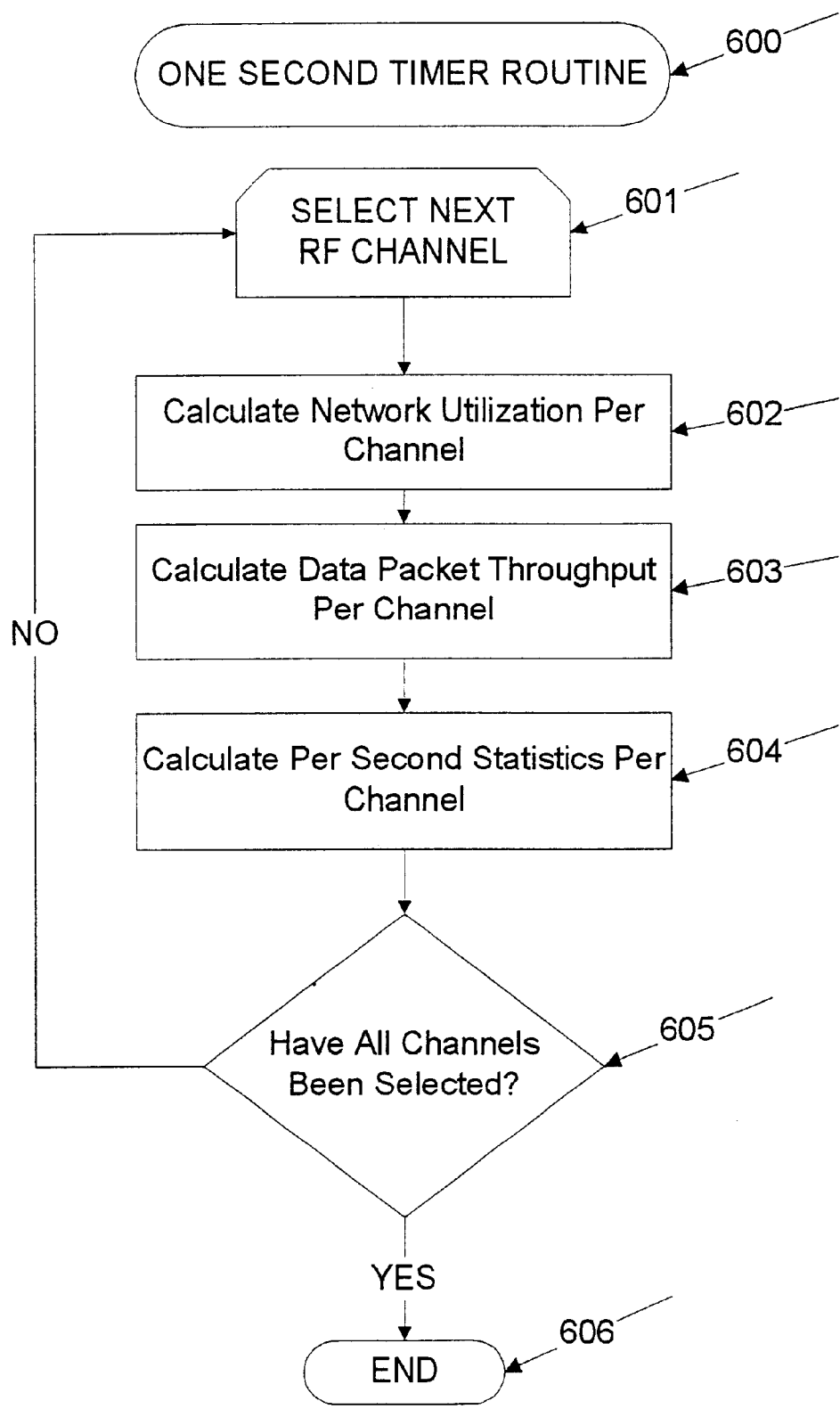
FIG. 6 shows a "One Second Timer Routine" flowchart for one embodiment of the invention.

Referring to FIG. 6, A One Second Timer Routine (600) includes steps 601 through 605, which is called by the Operating System when a one second time period has elapsed. The One Second Timer Routine (600) will execute the appropriate functionality for each RF Channel in the Wireless Network, by preferably selecting (Step 601) the Fourteen Channels in this example in sequence, to Calculate Network Utilization Per Channel (602), Calculate Data Packet Throughput Per Channel (603), and to Calculate Per Second Statistics Per Channel (604) observed by the Sniffer® Wireless Analyzer. The routine 600 is terminated at 606 after all the RF Channels have been processed.

Figure 7:
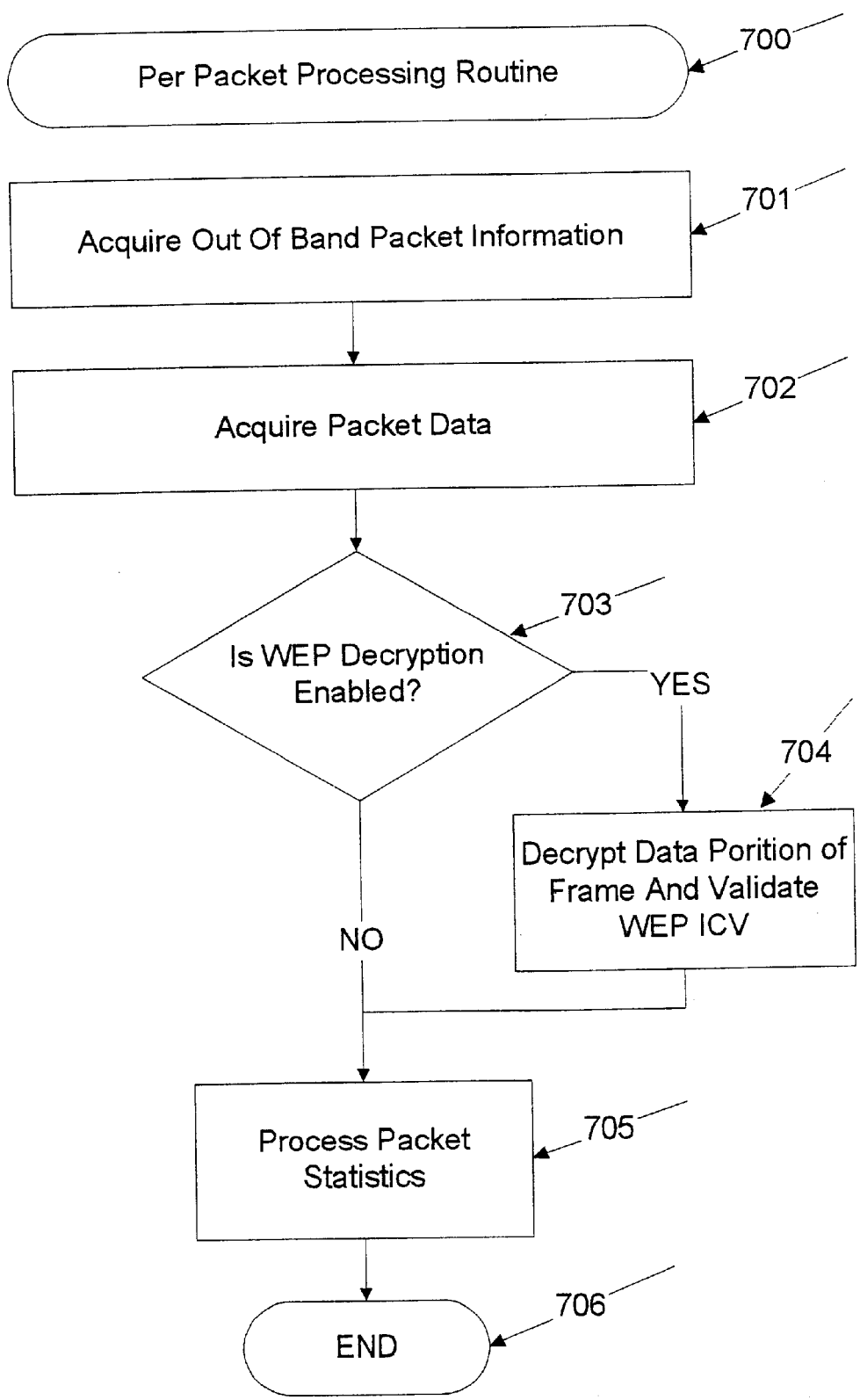
FIG. 7 shows a flowchart for a "Per-Packet Processing Routine" for an embodiment of the invention.

Referring to FIG. 7, a Per Packet Processing Routine (700) includes steps 701–706, and executes whenever a packet is received by the Wireless LAN Adapter (213). The NAI Sniffer® Adapter Software Driver Process (207) and the Sniffer® Kernel Mode Software Process (205) perform this per packet processing. The first step in the Per Packet Processing Routine (700) is to Acquire Out Of Band Data (701). Typically, a Wireless LAN Adapter (213) will have some mechanism for acquiring data that exists which describes information about a received packet. This out of band data is used to describe conditions of the network. For example, RSSI (Received Signal Strength Indicator) is one of these conditions. The next step is to Acquire Packet Data (702). In this step, the packet data received by the Wireless LAN Adapter (213) is copied from the Wireless LAN Adapter (213) into the NAI Sniffer® Adapter Software Driver Process (207) for further processing. Step (703) describes a condition where if WEP Decryption is enabled, then further WEP decryption can occur. If (703) condition is YES, then Step (704) will Decrypt the Data Portion of the 802.11 Data Frame and do a validation check on the WEP ICV. The Process Packet Statistics (705) process will accumulate the statistics observed by the Sniffer® Wireless System (201).

Figure 8:
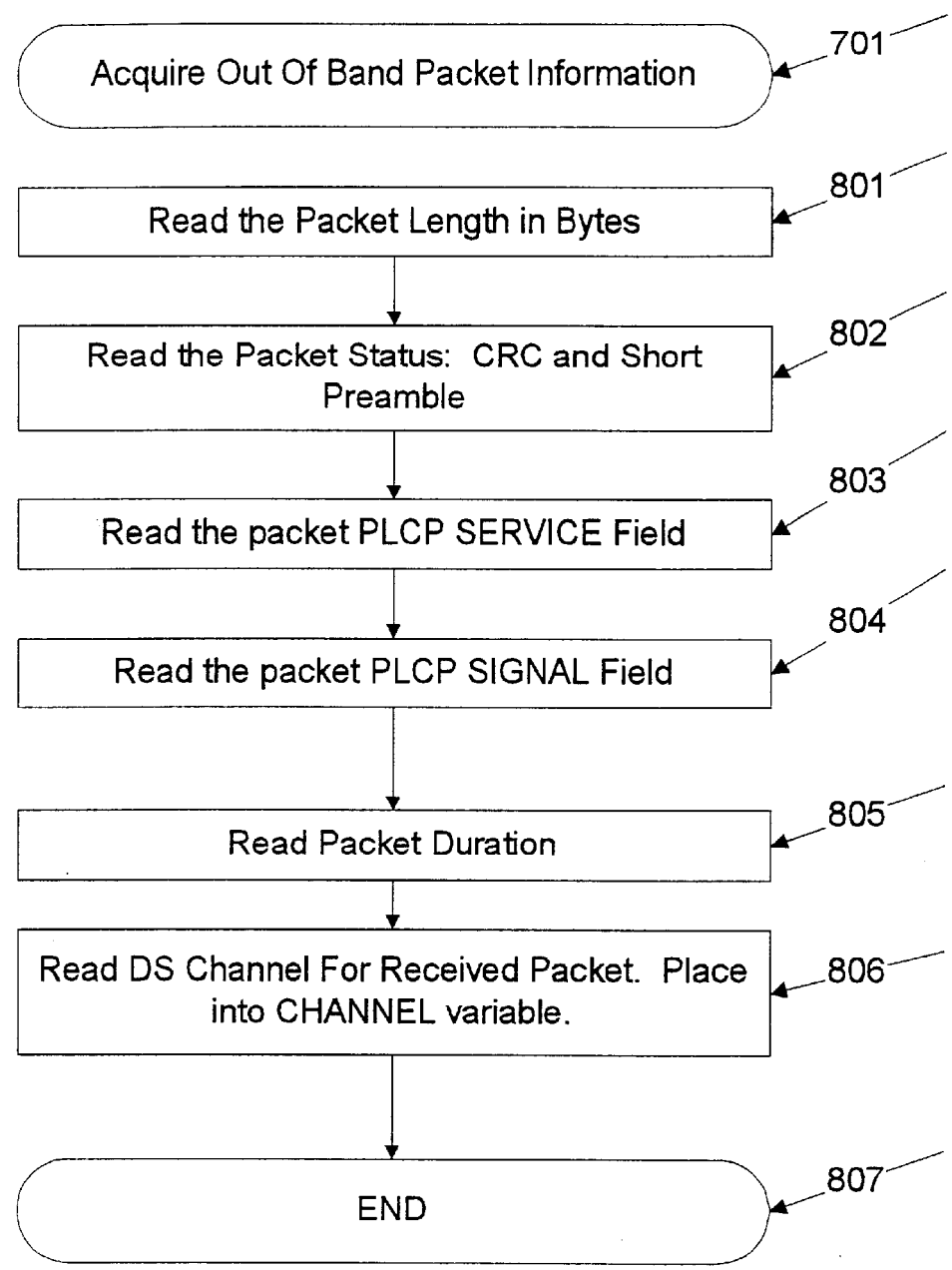
FIG. 8 shows a flowchart of the steps for a subroutine to provide the "Acquire Out of Band Packet Information" step of FIG. 7.

Referring to FIGS. 7 and 8, the Acquire Out Of Band Packet Information (701) includes a subroutine of Steps 801–807. The first step is to Read The Packet Length (801) of the received packet. Next, the CRC Error Status and Short Preamble Status are read from the Wireless LAN Adapter (213) in step 802. Step 803 indicates that the PLCP Header SERVICE Field shall be read from the Wireless LAN Adapter (XXX). Step 804 indicates that the PLCP Header SIGNAL Field shall be read from the Wireless LAN Adapter. Step 805 determines the current packet duration in microseconds. Step 806 determines the Direct Sequence RF Channel for which the packet was received. It stores this into the variable named CHANNEL for further processing of packet statistics. The subroutine terminates at "End" 809.

Figure 9:
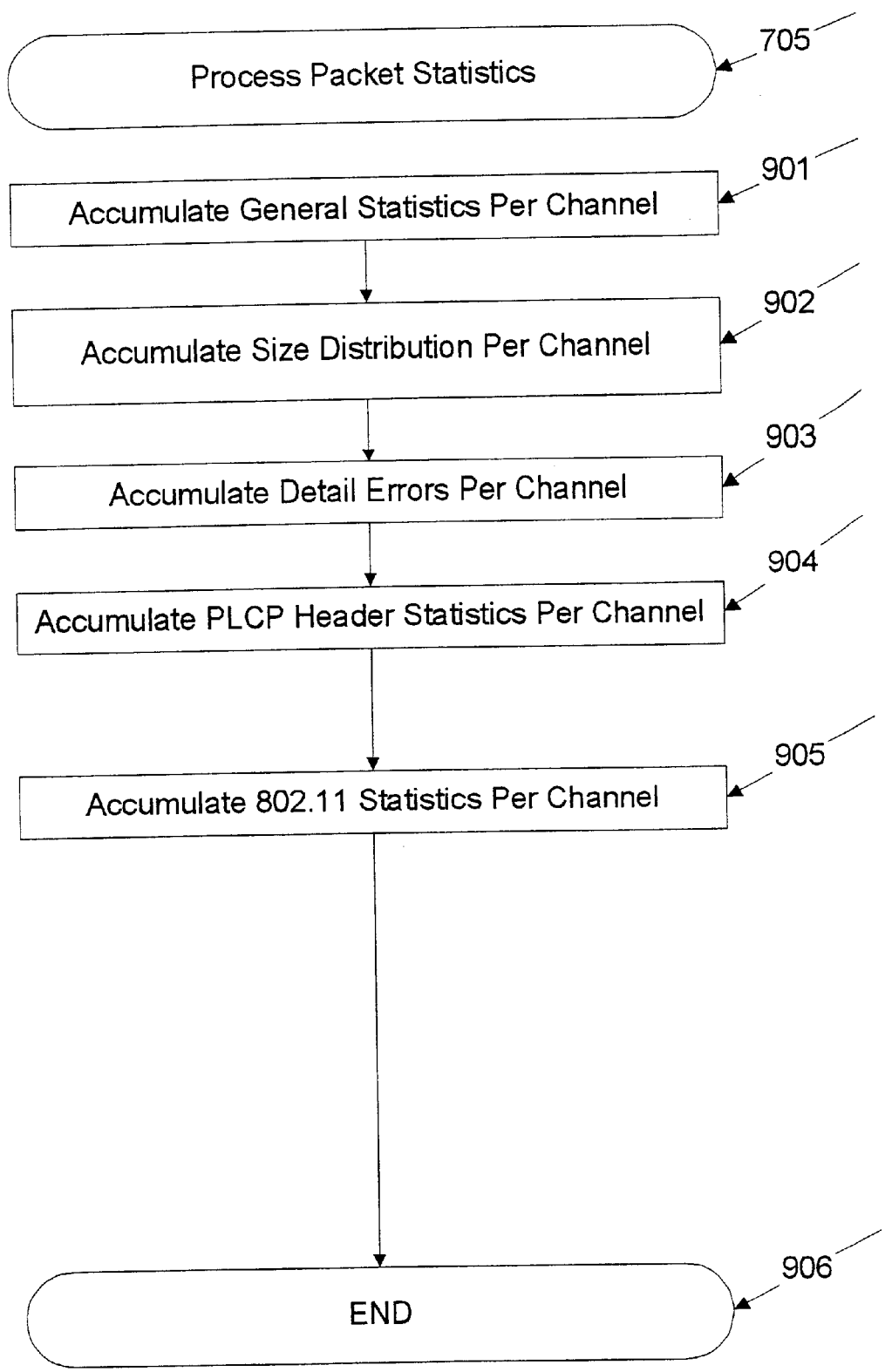
FIG. 9 is a flowchart showing the subroutine steps required for providing the "Processed Packet Statistics" step of the flowchart of FIG. 7.

Referring to FIGS. 7 and 9, the Process Packet Statistics (705) includes a subroutine of steps 901–905, terminating at "END" 906. First, Accumulate General Statistics Per Channel (901) accumulates statistics for Packets, Octets, Broadcast and Multicast Packet counters. Second, Accumulate Size Distribution Per Channel (902) uses the received packet length to accumulate the appropriate Size Distribution statistics observed by the Sniffer® Wireless System (201). Third, Accumulate Detail Errors Per Channel (903) accumulates error statistics for the current received packet if it has an error. Next, Accumulate PLCP Header Statistics Per Channel (904) uses the PLCP Header SIGNAL and SERVICE field to determine the 802.11 packet rate distribution (1 Mbps, 2 Mbps, 5.5 Mbps, or 11 Mbps) statistics and accumulate the SHORT PLCP and LONG PLCP header statistics. Step 905 Accumulates 802.11 Statistics Per Channel.

Figure 10:
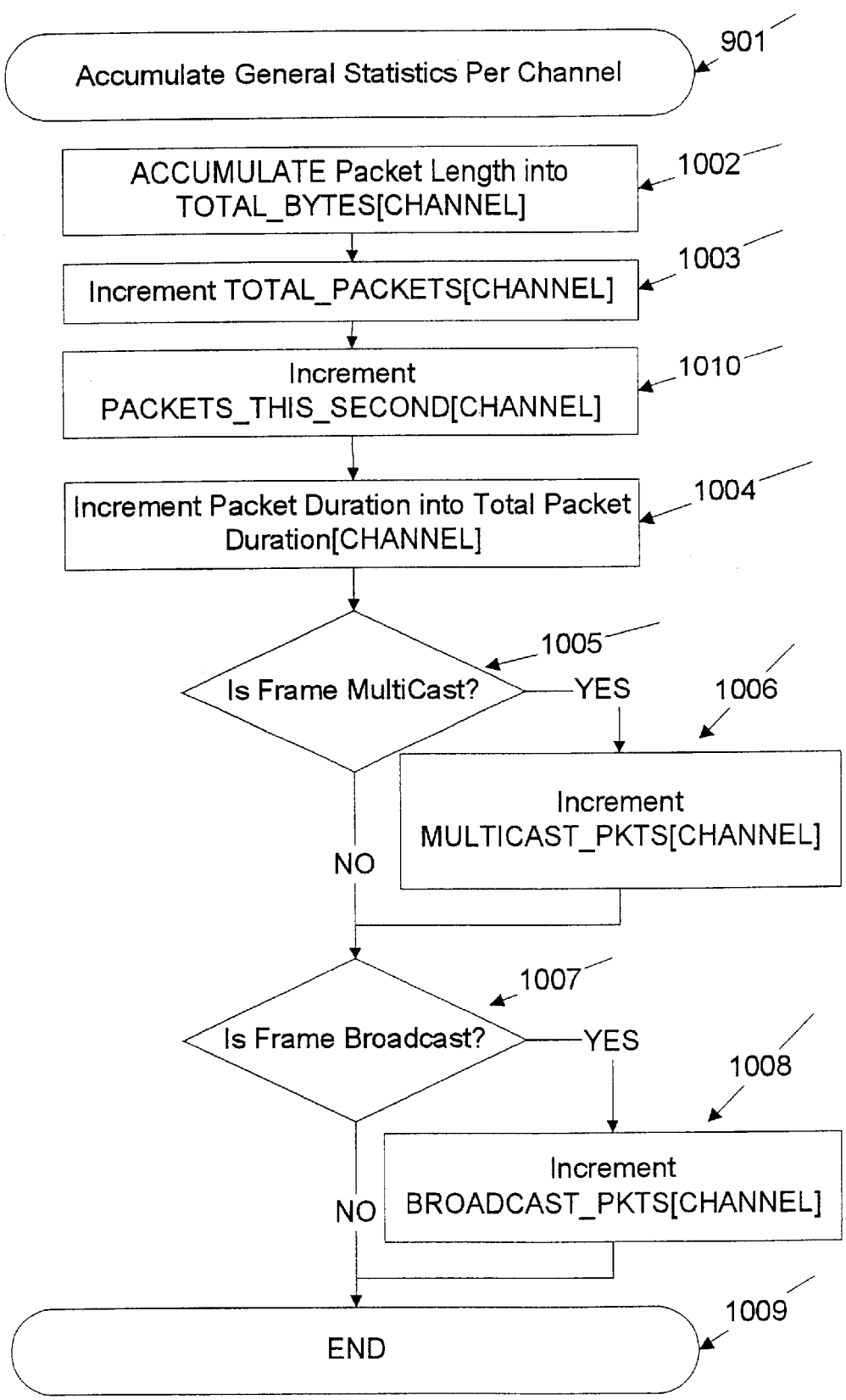
FIG. 10 is a flowchart showing a subroutine for providing the "Accumulate General Statistics Per Channel" step of the flowchart of FIG. 9.

Referring to FIGS. 9 and 10, the step Accumulate General Statistics Per Channel (901) is provided by a subroutine including steps 1002–1009. Step 1002 accumulates the current packet data length into the variable TOTAL_BYTES[CHANNEL]. Step 1003 increments the TOTAL_PACKETS[CHANNEL] received. Step 1004 accumulates the received packet microsecond duration found in step 805 (see FIG. 8) into the TOTAL_PACKET_MICROSECONDS[CHANNEL] variable. The conditional step 1005 determines if the Receiver Address as specified in ISO/IEC 8802-11 (ANSI/IEEE Std. 802.11, First Edition, 1999-00-00) is a Multi Cast Address. If so, then step 1006 increments the MULTICAST_PKTS[CHANNEL] variable. The conditional Step 1007 determines if the Receiver Address as specified is the Broadcast Address. If so, then step 1008 will increment the BROADCAST_PKTS[CHANNEL] variable.

Figure 11:
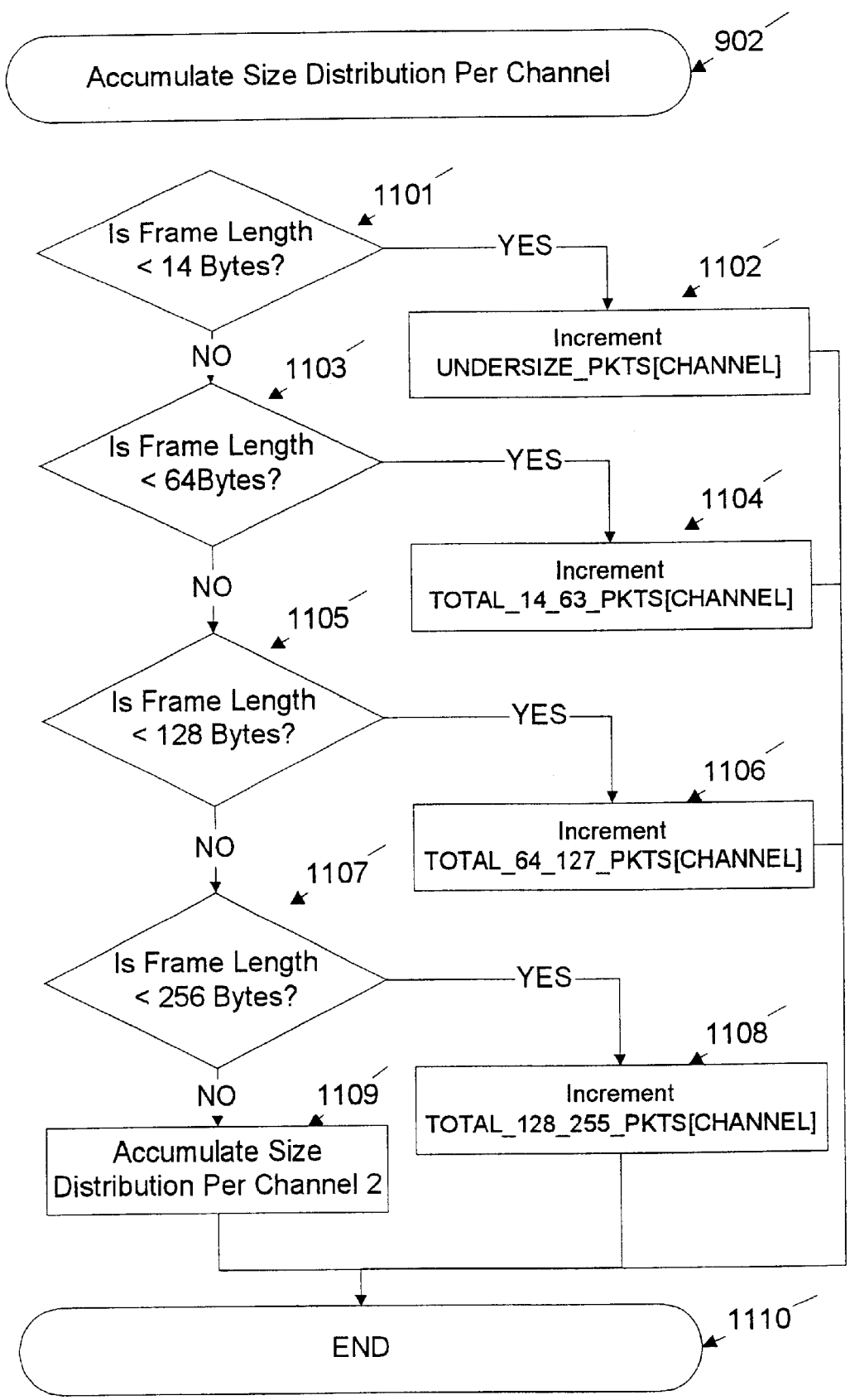
FIG. 11 is a flowchart showing a subroutine for the steps necessary to provide the "Accumulate Size Distribution Per Channel" step of the flowchart of FIG. 9.

Referring to FIGS. 9 and 11, the step Accumulate Size Distribution Per Channel (902) is provided by subroutine steps 1101–1109, terminating at "END" 1110. Conditional step 1101 determines if the length of the current frame is less than 14 bytes. If YES, then step 1102 increments the variable UNDERSIZE_PKTS[CHANNEL]. If NO, then step 1103 determines if the length of the current frame is less than 64 bytes. If YES, then step 1104 increments the variable TOTAL_14_63_PKTS[CHANNEL]. If NO, then step 1105 determines if the length of the current frame is less than 128 bytes. If YES, then step 1106 increments the variable TOTAL_64_127_PKTS[CHANNEL]. If NO, then step 1107 determines if the length of the current frame is less than 256 bytes. If YES, then step 1108 increments the variable TOTAL_128_255_PKTS[CHANNEL]. If NO, then step 1109 executes Accumulate Size Distribution Per Channel 2. After either steps 1108 or 1109, the subroutine terminates at "END" 1110.

Figure 12:
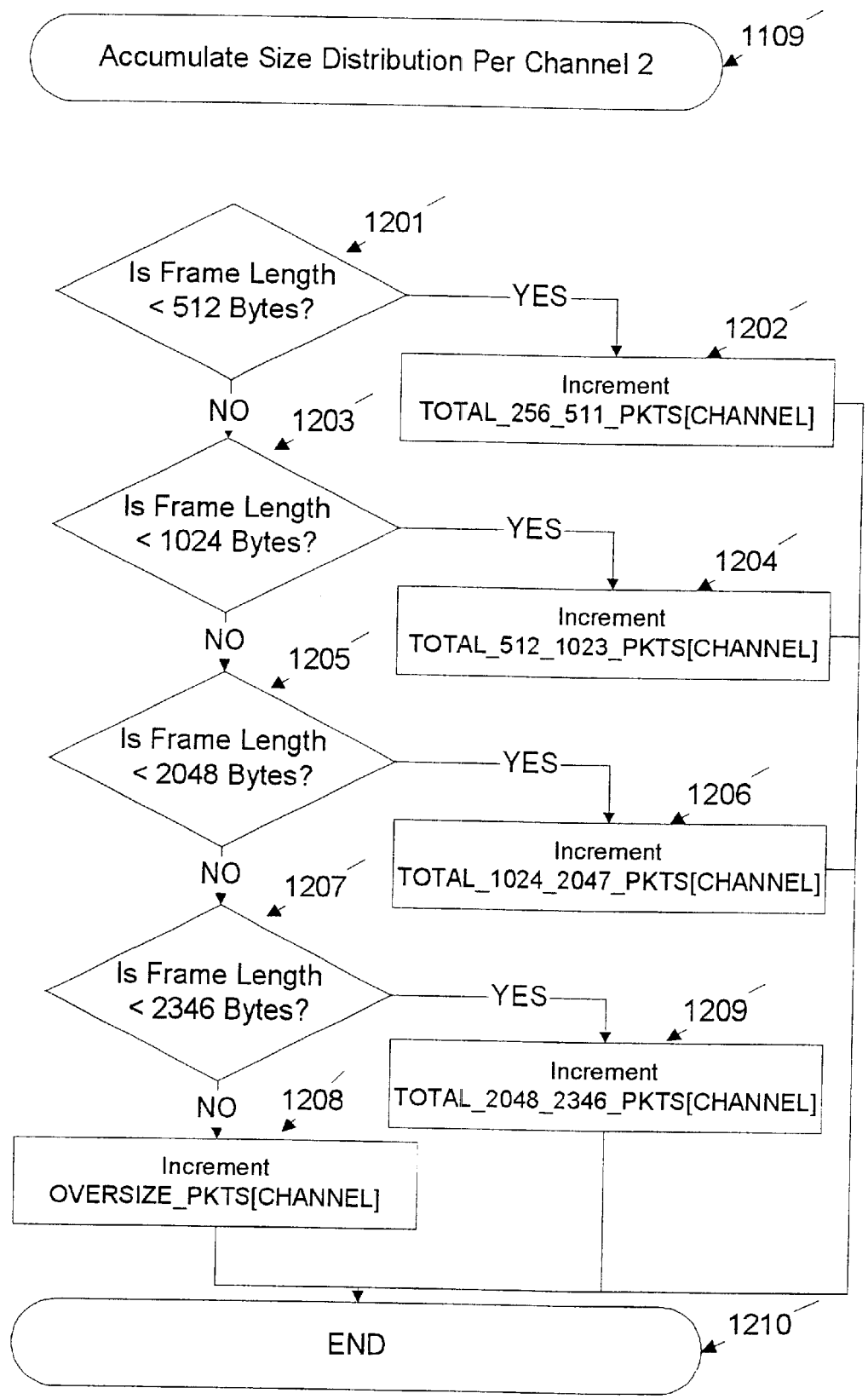
FIG. 12 is a flowchart showing a subroutine of the steps required for providing the "Accumulate Size Distribution Per Channel 2" step of the flowchart of FIG. 11.

Referring to FIGS. 11 and 12, the step Accumulate Size Distribution Per Channel 2 (1109) is provided by a subroutine of steps 1201–1209, terminating at "END" 1210. Conditional step 1201 determines if the length of the current frame is less than 512 bytes. If YES, then step 1202 increments the variable TOTAL_256_511_PKTS[CHANNEL]. If NO, then step 1203 determines if the length of the current frame is less than 1024 bytes. If YES, then step 1204 increments the variable TOTAL_512_1023_PKTS[CHANNEL]. If NO, then step 1205 determines if the length of the current frame is less than 2048 bytes. If YES, then step 1206 increments the variable TOTAL_1024_2047_PKTS[CHANNEL]. If NO, then step 1207 determines if the length of the current frame is less than 2346 bytes. If YES, then step 1209 increments the variable TOTAL_2046_2346_PKTS[CHANNEL]. If NO, then step 1208 increments the variable OVERSIZE_PKTS[CHANNEL].

Figure 13:
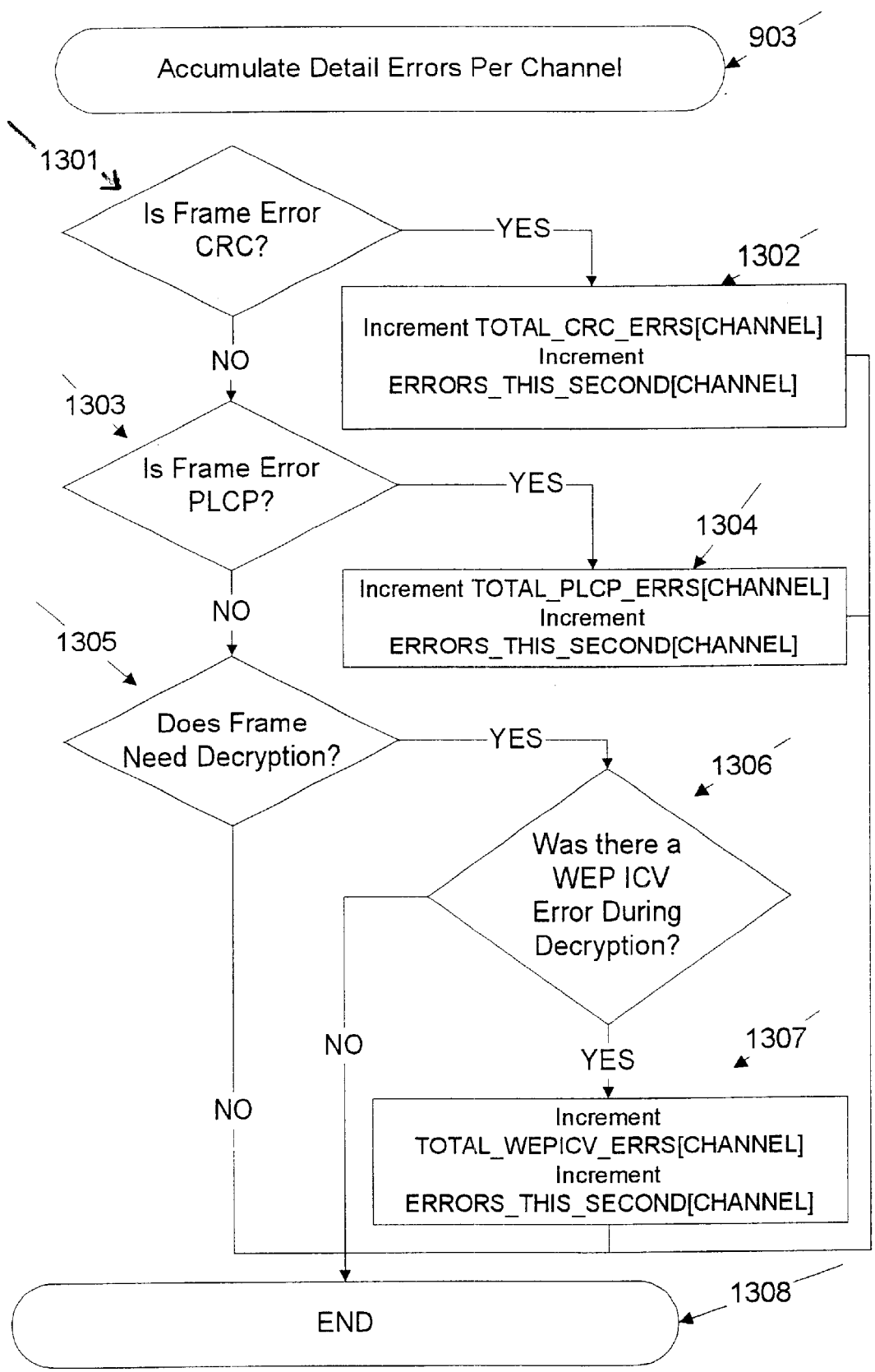
FIG. 13 is a flowchart of a subroutine for providing the "Accumulate Detail Errors Per Channel" step of the flowchart of FIG. 9.

Referring to FIGS. 9 and 13, the step Accumulate Detail Errors Per Channel (903) is provided by a subroutine of steps 1301–1307, terminating at "END" 1308. Conditional step 1301 determines if the current packet received has a CRC error. If YES, then step 1302 will increment the variable TOTAL_CRC_ERRS[CHANNEL]. If NO, then conditional step 1303 determines if the current frame has a PLCP error. If YES, then step 1304 will increment the variable TOTAL_PLCP_ERRS[CHANNEL]. If NO, then conditional step 1305 determines if the frame decryption occurred. If YES, then conditional step 1306 determines if there was a WEP ICV error during decryption. If YES, then step 1307 increments the variable TOTAL_WEPICV_ERRS[CHANNEL].

Figure 14:
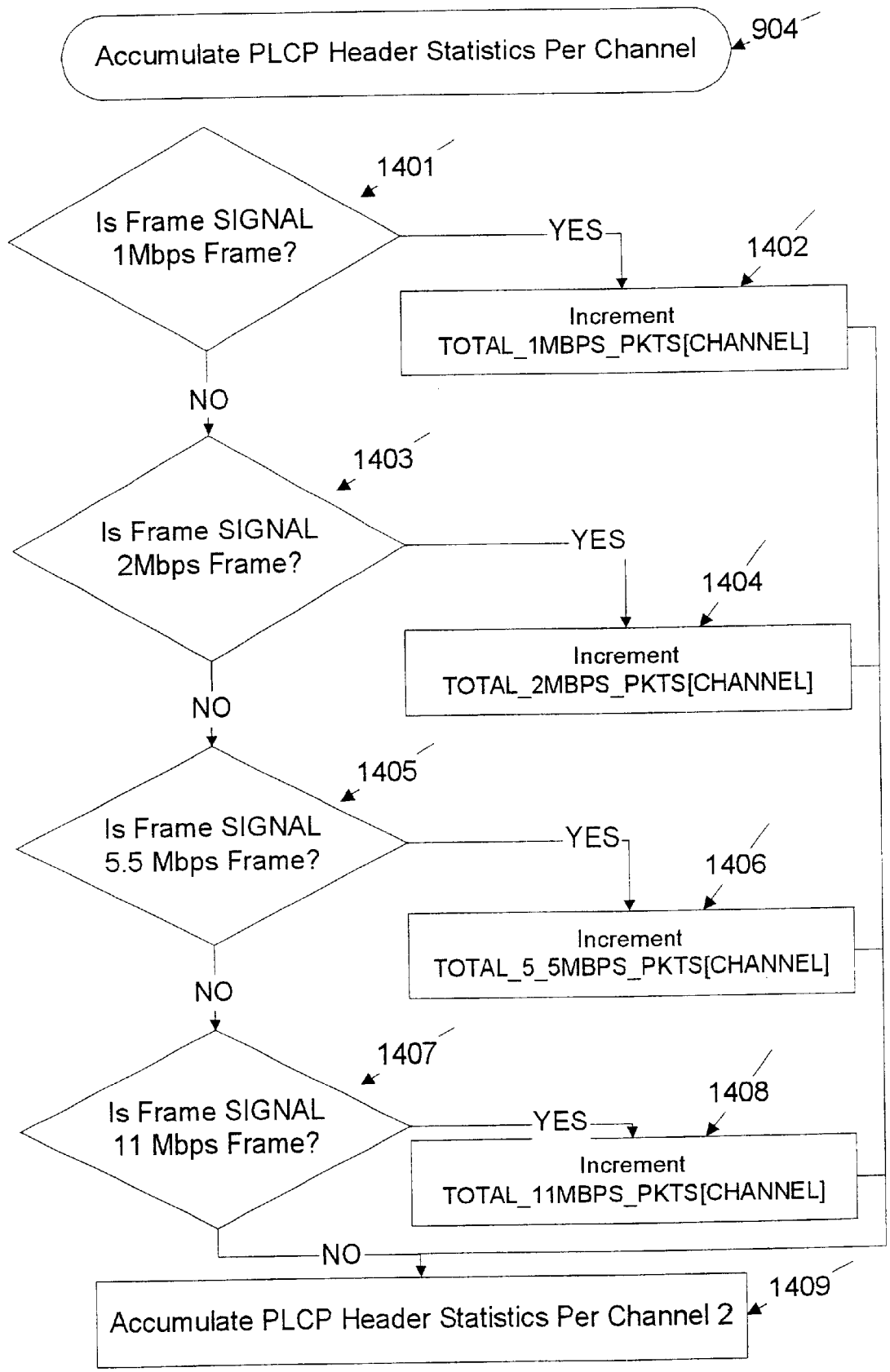
FIG. 14 is a flowchart showing a subroutine of the steps required to provide the "Accumulate PLCP Header Statistics Per Channel" step of the flowchart of FIG. 9.

Referring to FIGS. 9 and 14, the step Accumulate PLCP Header Statistics Per Channel (904) is provided by a subroutine of steps 1401–1409. Conditional step 1401 determines if the current packet received PLCP Header SIGNAL field describes the frame as being transmitted at 1 Mbps Barker Code. If YES, then step 1402 increments the variable TOTAL_1 MBPS_PKTS[CHANNEL]. If NO, then conditional step 1403 determines if the current packet received PLCP Header SIGNAL field describes the frame as being transmitted at 2 Mbps Barker Code. If YES, then step 1404 increments the variable TOTAL_2 MBPS_PKTS [CHANNEL]. If NO, then conditional step 1405 determines if the current packet received PLCP Header SIGNAL field describes the frame as being transmitted at 5.5 Mbps CCK Code. If YES, then step 1406 increments the variable TOTAL_5_5 MBPS_PKTS[CHANNEL]. If NO, then conditional step 1407 determines if the current packet received PLCP Header SIGNAL field describes the frame as being transmitted at 11 Mbps CCK Code. If YES, then step 1408 increments the variable TOTAL_11 MBPS_PKTS [CHANNEL]. Step 1409 executes Accumulate PLCP Header Statistics Per Channel 2.

Figure 15:
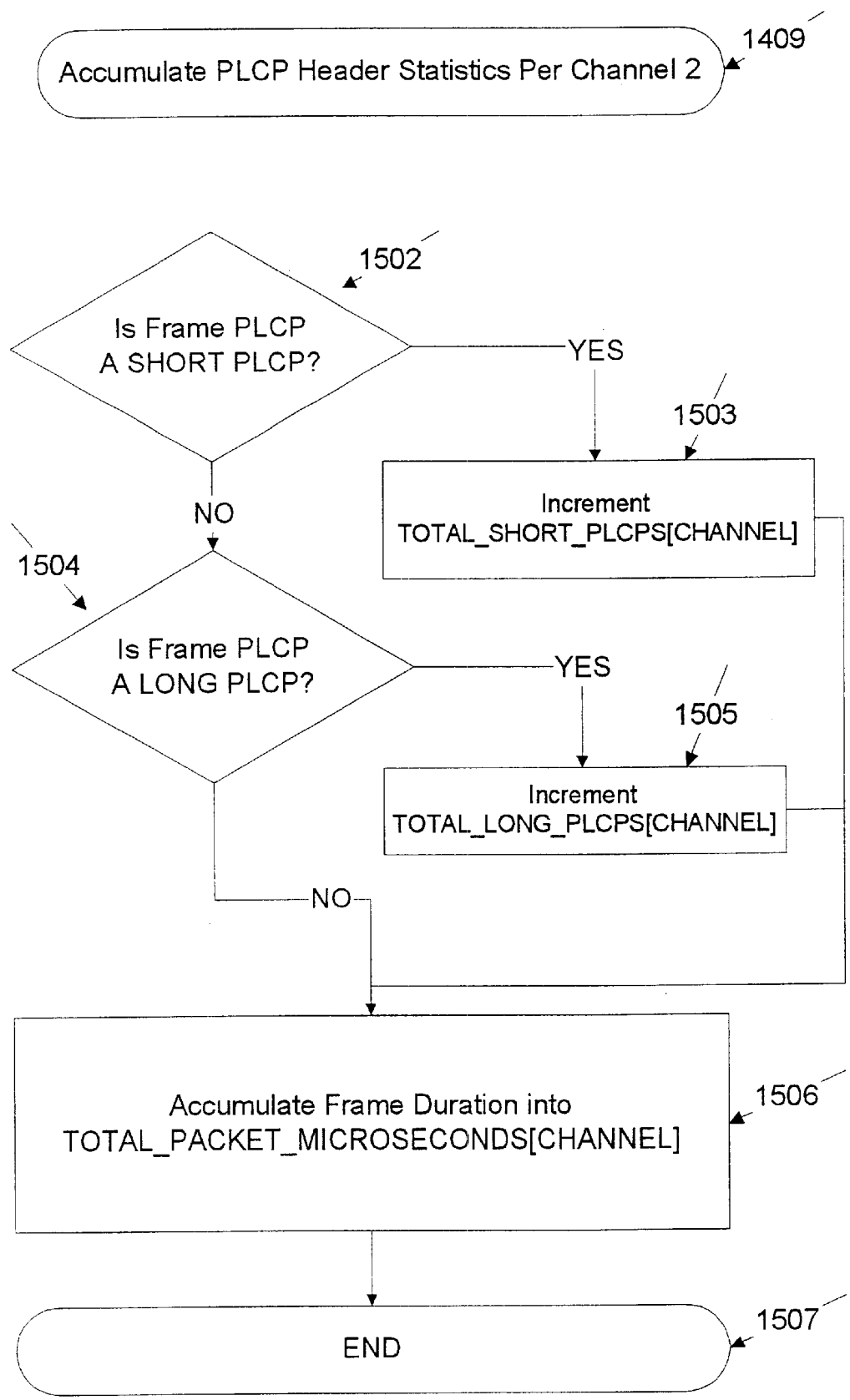
FIG. 15 is a flowchart for a subroutine showing the steps required to provide the "Accumulate PLCP Header Statistics Per Channel 2" step of the flowchart of FIG. 14.

Referring to FIGS. 14 and 15, the step (1409) Accumulate PLCP Header Statistics Per Channel 2 is provided by a subroutine of Steps 1502–1506. Conditional step 1502 determines if the PLCP header of the current received packet is a SHORT PLCP. If YES, then step 1503 increments the variable TOTAL_SHORT_PLCPS[CHANNEL]. If NO, then conditional step 1504 determines if the PLCP header of the current received packet is a LONG PLCP. If YES, then step 1505 increments the variable TOTAL_LONG_PLCPS [CHANNEL]. Step 1506 accumulates the current frame microsecond duration into the variable TOTAL_PACKET_MICROSECONDS[CHANNEL].

Figure 16:
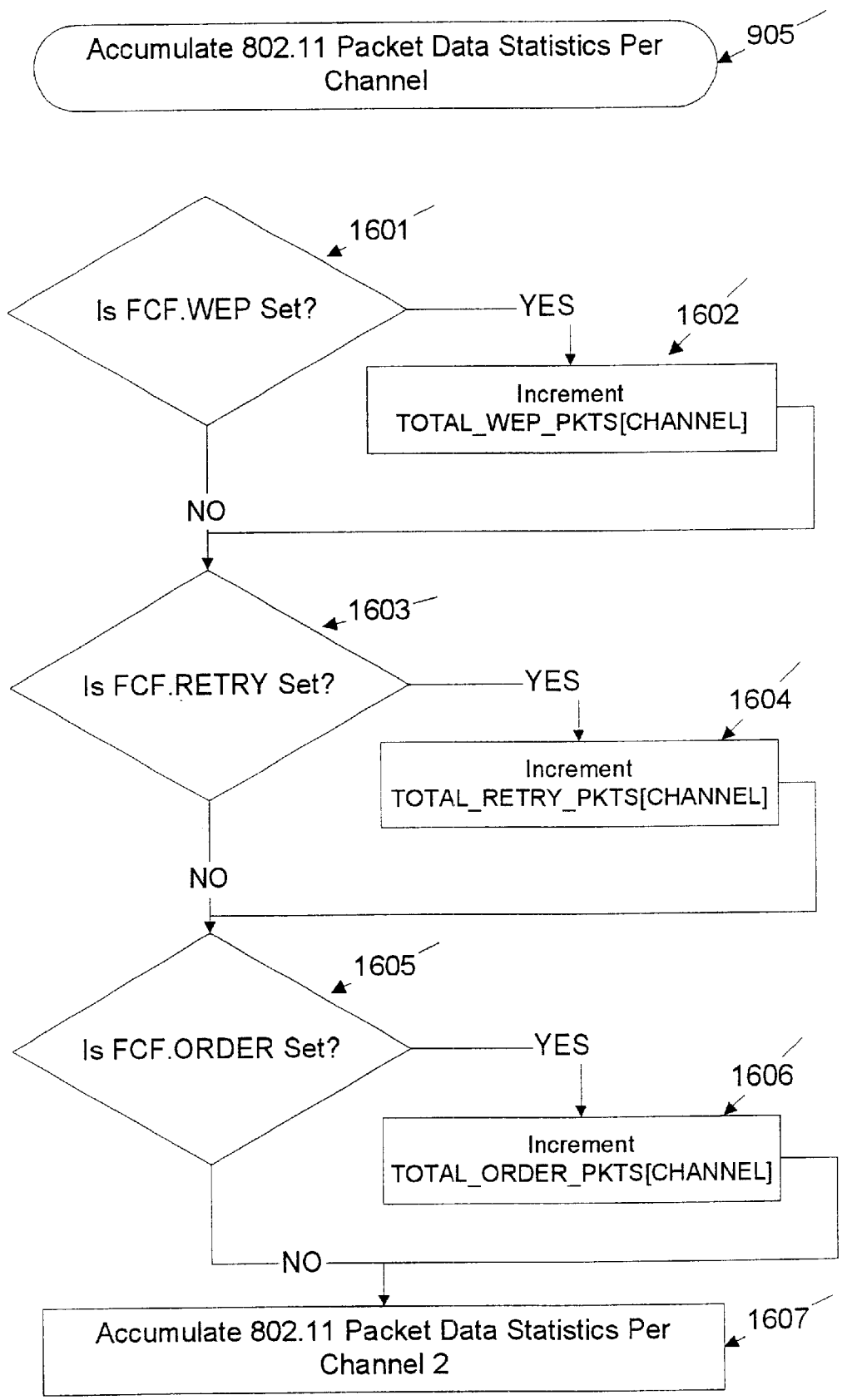
FIG. 16 is a flowchart of a subroutine for the steps required to provide the "Accumulate 802.11 Packet Data Statistics Per Channel" step of the flowchart of FIG. 9.

Referring to FIGS. 9 and 16, step 905, Accumulate 802.11 Packet Data Statistics Per Channel, is provided by a subroutine of Steps 1601–1607. Conditional step 1601 determines if the WEP Privacy bit in the 802.11 Frame Control Field is set. If YES, then step 1602 increments the variable TOTAL_WEP_PKTS[CHANNEL]. If No or after step 1602, conditional step 1603 determines if the Retry bit in the 802.11 Frame Control Field is set. If YES, then step 1604 increments the variable TOTAL_RETRY_PKTS [CHANNEL]. If No, or after step 1604, conditional step 1605 determines if the Order bit in the 802.11 Frame Control Field is set. If YES, then step 1606 increments the variable TOTAL_ORDER_PKTS[CHANNEL]. If No, or after Step 1606, Step 1607 executes Accumulate 802.11 Packet Data Statistics Per Channel 2.

Figure 17:
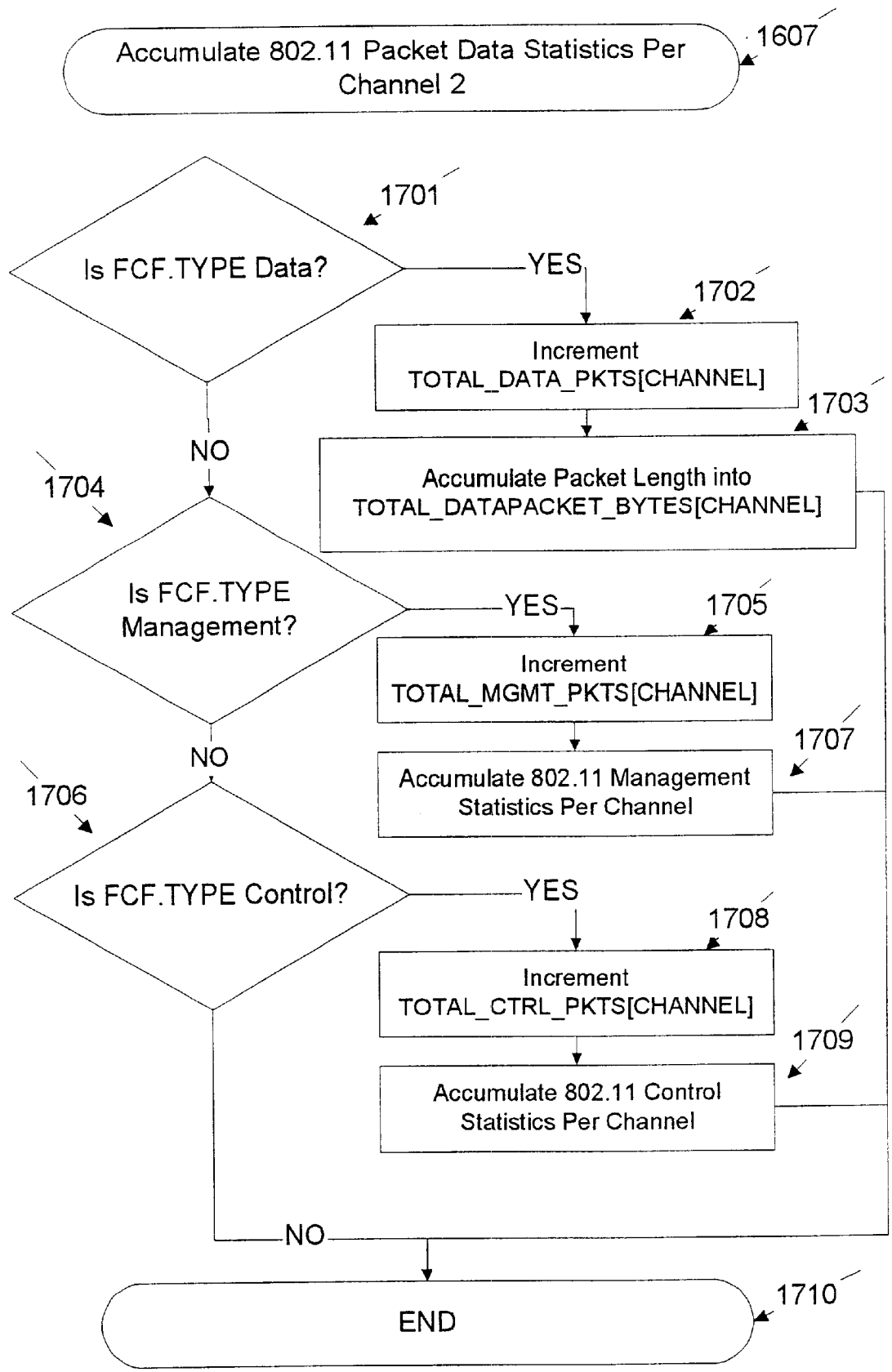
FIG. 17 is a flowchart showing a subroutine of the steps required for providing the "Accumulate 802.11 Packet Data Statistics Per Channel 2" step of the flowchart of FIG. 16.

Referring to FIGS. 16 and 17, the step Accumulate 802.11 Packet Data Statistics Per Channel 2 (1607) is provided by a subroutine of Steps 1701–1709, terminating at "END" 1710. Conditional step 1701 determines if the type field of the 802.11 Frame Control Field contains the value indicating that the 802.11 frame is a data frame. If YES, then step 1702 increments the variable TOTAL_DATA_PKTS [CHANNEL] and step 1703 accumulates the current received packet data length into TOTAL_DATAPACKET_BYTES[CHANNEL]. If NO, then conditional step 1704 if determines if the type field of the 802.11 Frame Control Field contains the value indicating that the 802.11 frame is a management frame. If YES, then step 1705 increments the variable TOTAL_MGMT_PKTS[CHANNEL], and step 1707 executes the Accumulate 802.11 Management Packet Statistics Per Channel. If NO, then conditional step 1706 if determines if the type field of the 802.11 Frame Control Field contains the value indicating that the 802.11 frame is a Control Frame. If YES, then step 1708 increments the variable TOTAL_MGMT_PKTS[CHANNEL], and step 1709 executes the Accumulate 802.11 Control Packet Statistics Per Channel.

Figure 18:
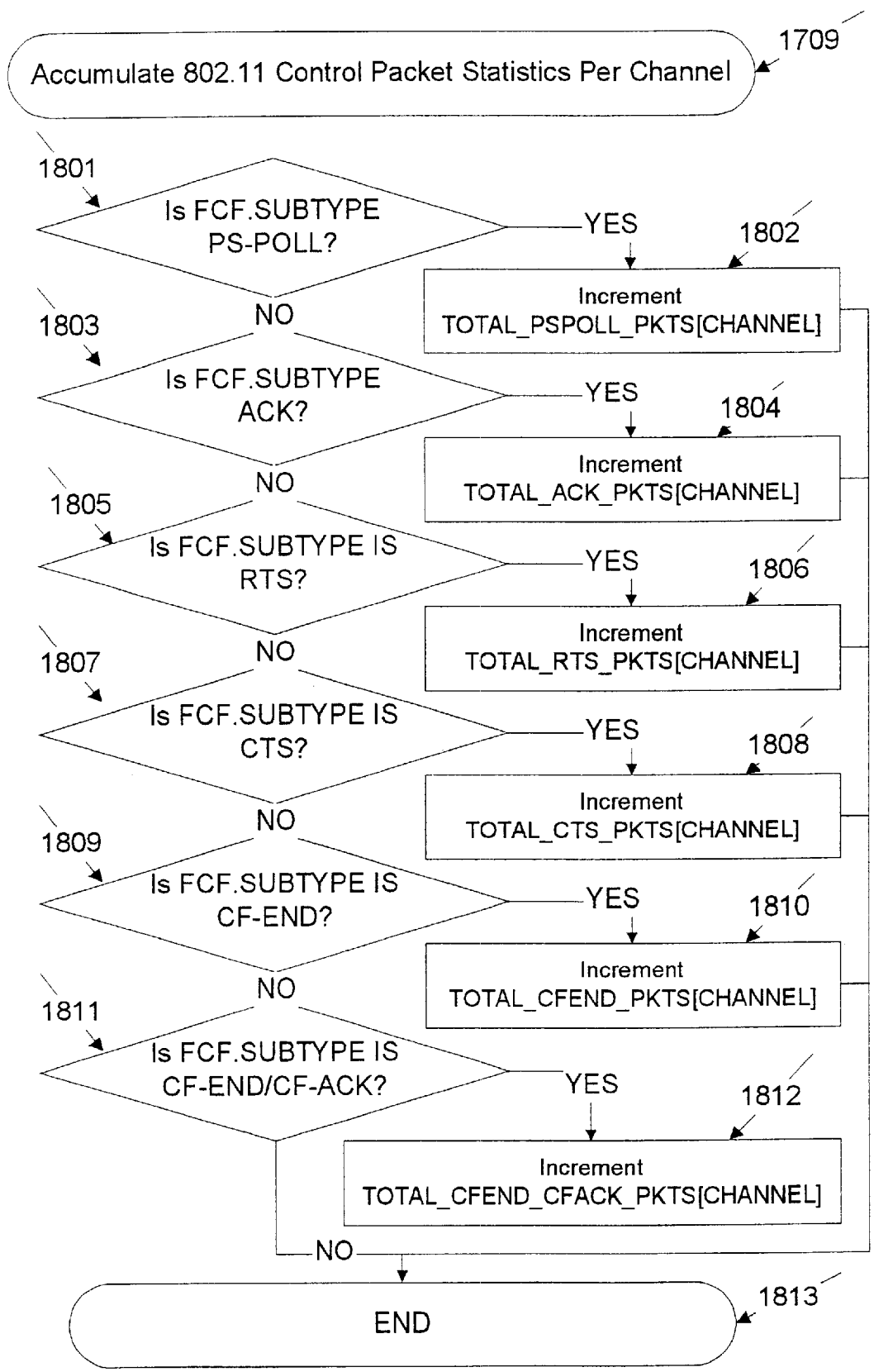
FIG. 18 is a flowchart showing a subroutine of the steps required for providing the "Accumulate 802.11 Control Packet Statistics Per Channel" step of the flowchart of FIG. 17.

Referring to FIGS. 17 and 18, step 1709, Accumulate 802.11 Control Packet Statistics Per Channel, is provided by a subroutine including steps 1801–1812, terminating at "END" 1813. Conditional step 1801 determines if the sub-type field of the 802.11 Frame Control Field contains the value indicating that the 802.11 Control frame is a PS-POLL Control frame. If YES, then step 1802 increments the variable TOTAL_PSPOLL_PKTS[CHANNEL]. If NO, then conditional step 1803 determines if the sub-type field of the 802.11 Frame Control Field contains the value indicating that the 802.11 Control frame is an ACK Control frame. If YES, then step 1804 increments the variable TOTAL_ACK_PKTS[CHANNEL]. If NO, then conditional step 1805 determines if the sub-type field of the 802.11 Frame Control Field contains the value indicating that the 802.11 control frame is a RTS Control frame. If YES, then step 1806 increments the variable TOTAL_RTS_PKTS [CHANNEL]. If NO, then conditional step 1807 determines if the sub-type field of the 802.11 Frame Control Field contains the value indicating that the 802.11 Control frame is a CTS Control frame. If YES, then step 1808 increments the variable TOTAL_CTS_PKTS[CHANNEL]. If NO, then conditional step 1809 determines if the sub-type field of the 802.11 Frame Control Field contains the value indicating that the 802.11 Control frame is a CF-END Control frame. If YES, then step 1810 increments the variable TOTAL_CFEND_PKTS[CHANNEL]. If NO, then conditional step 1811 determines if the sub-type field of the 802.11 Frame Control Field contains the value indicating that the 802.11 Control frame is a CF-END/CF-ACK Control frame. If YES, then step 1812 increments the variable TOTAL_CFEND_CFACK_PKTS[CHANNEL].

Figure 19:
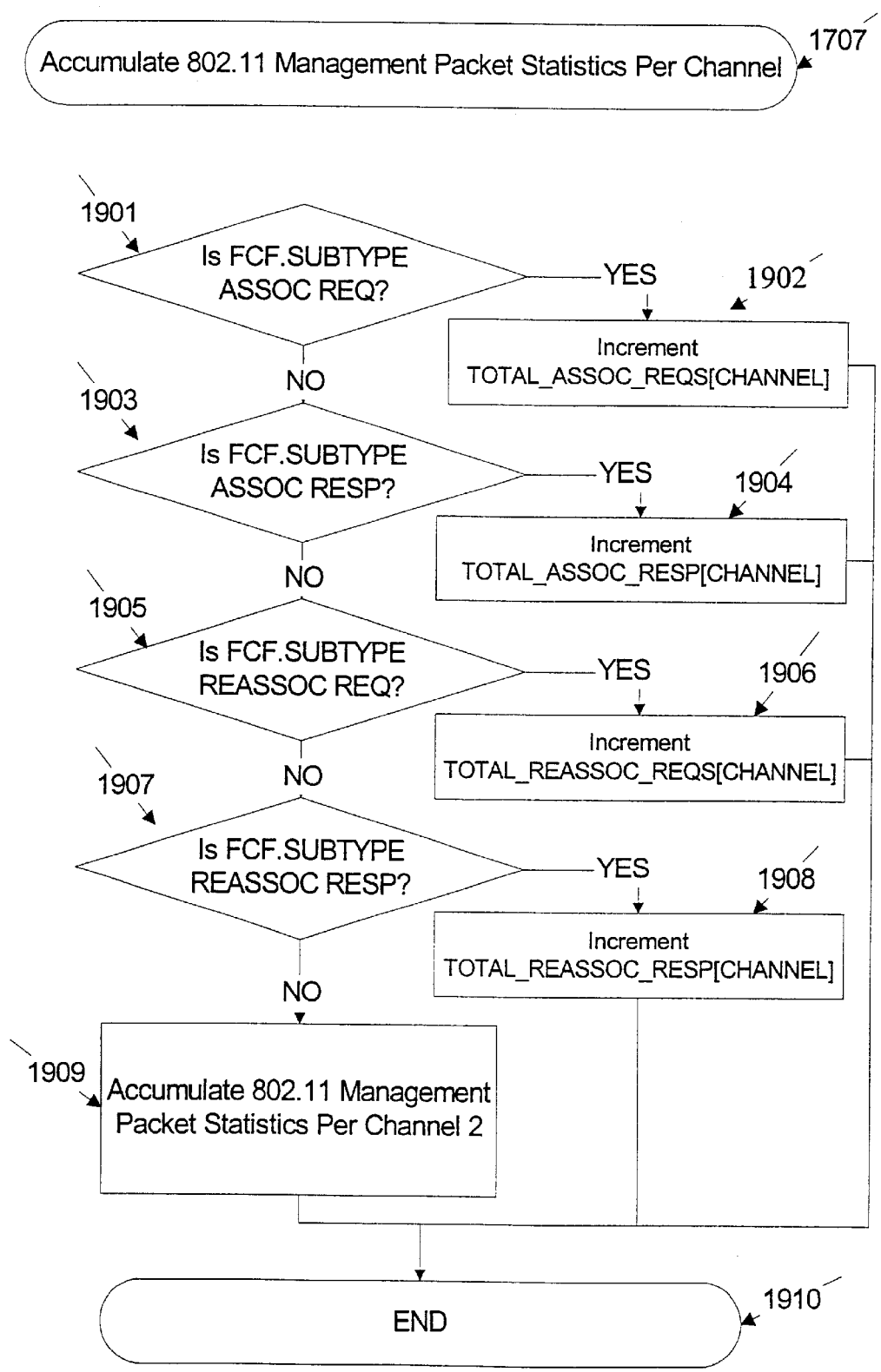
FIG. 19 shows a flowchart of a subroutine of the steps required for providing the "Accumulate 802.11 Management Packet Statistics Per Channel" step of FIG. 17.

Referring to FIGS. 17 and 19, the step Accumulate 802.11 Management Packet Statistics Per Channel (1707) is providing by a subroutine including steps 1901–1909, terminating at "END" 1910. Conditional step 1901 determines if the sub-type field of the 802.11 Frame Control Field contains the value indicating that the 802.11 Management frame is an ASSOCIATION REQUEST Management frame. If YES, then step 1902 increments the variable TOTAL_ASSOC_REQS[CHANNEL]. If NO, then conditional step 1903 determines if the sub-type field of the 802.11 Frame Control Field contains the value indicating that the 802.11 Management frame is an ASSOCIATION RESPONSE Management frame. If YES, then step 1904 increments the variable TOTAL_ASSOC_RESP[CHANNEL]. If NO, then conditional step 1905 determines if the sub-type field of the 802.11 Frame Control Field contains the value indicating that the 802.11 Management frame is a REASSOCIATION REQUEST Management frame. If YES, then step 1906 increments the variable TOTAL_REASSOC_REQS [CHANNEL]. If NO, then conditional step 1907 determines if the sub-type field of the 802.11 Frame Control Field contains the value indicating that the 802.11 Management frame is an REASSOCIATION RESPONSE Management frame. If YES, then step 1908 increments the variable TOTAL_REASSOC_RESP[CHANNEL]. If NO, then step 1909 executes Accumulate Management Packet Statistics Per Channel 2.

Figure 20:
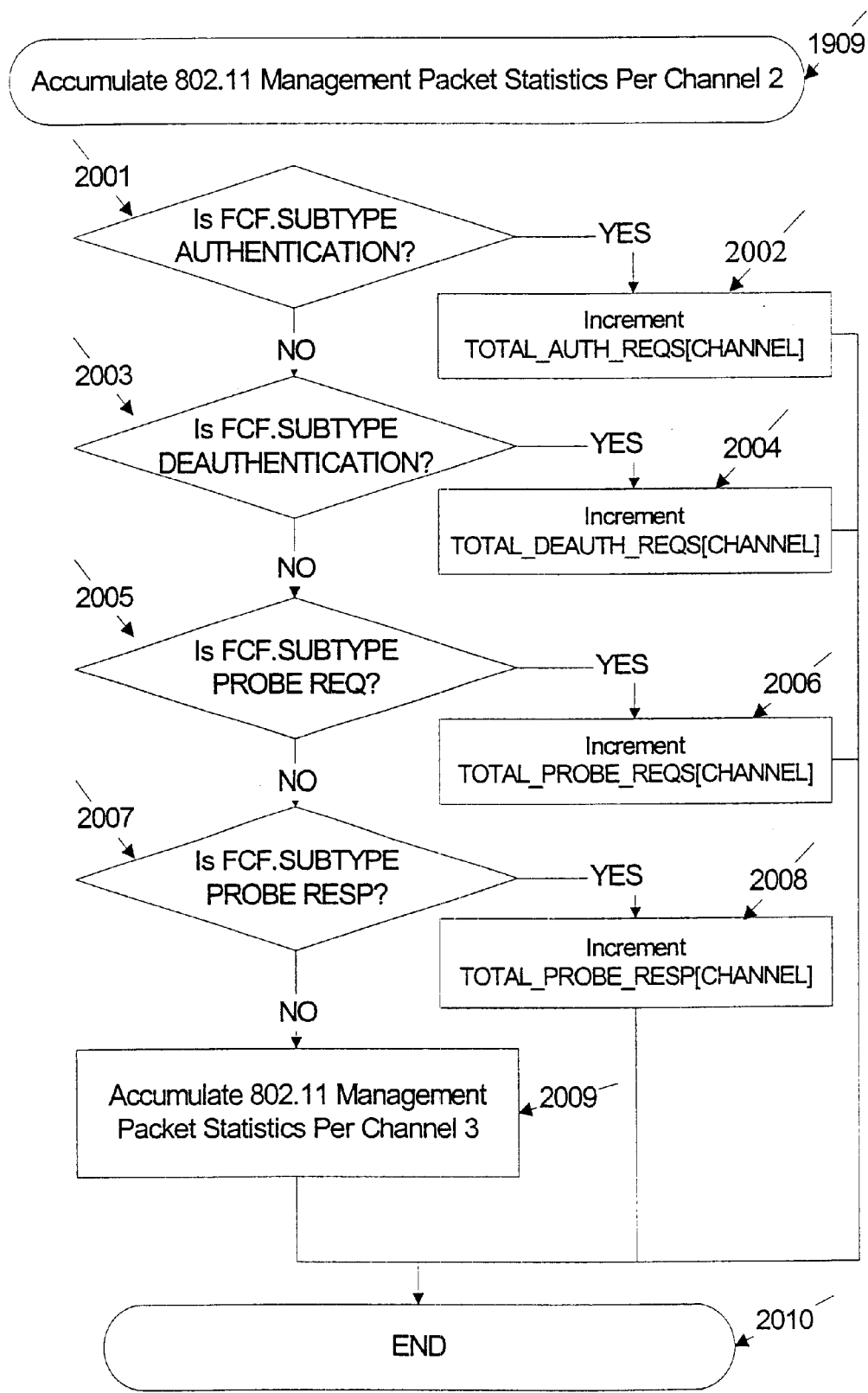
FIG. 20 shows a flowchart of a subroutine for the steps required for providing the "Accumulate 802.11 Management Packet Statistics Per Channel 2" step of the flowchart of FIG. 19.

Referring to FIGS. 19 and 20, the step 1909, Accumulate Management Packet Statistics Per Channel 2, is provided by a subroutine including Steps 2001–2009, terminating at "END" 2010. Conditional step 2001 determines if the sub-type field of the 802.11 Frame Control Field contains the value indicating that the 802.11 Management frame is an AUTHENTICATION Management frame. If YES, then step 2002 increments the variable TOTAL_AUTH_REQS [CHANNEL]. If NO, then conditional step 2003 determines if the sub-type field of the 802.11 Frame Control Field contains the value indicating that the 802.11 Management frame is a DEAUTHENTICATION Management frame. If YES, then step 2004 increments the variable TOTAL_DEAUTH_REQS[CHANNEL]. If NO, then conditional step 2005 determines if the sub-type field of the 802.11 Frame Control Field contains the value indicating that the 802.11 Management frame is a PROBE REQUEST Management frame. If YES, then step 2006 increments the variable TOTAL_PROBE_REQS[CHANNEL]. If NO, then conditional step 2007 determines if the sub-type field of the 802.11 Frame Control Field contains the value indicating that the 802.11 Management frame is a PROBE RESP Management frame. If YES, then step 2008 increments the variable TOTAL_PROBE_RESP[CHANNEL]. If NO, then step 2009 executes Accumulate Management Packet Statistics Per Channel 3.

Figure 21:
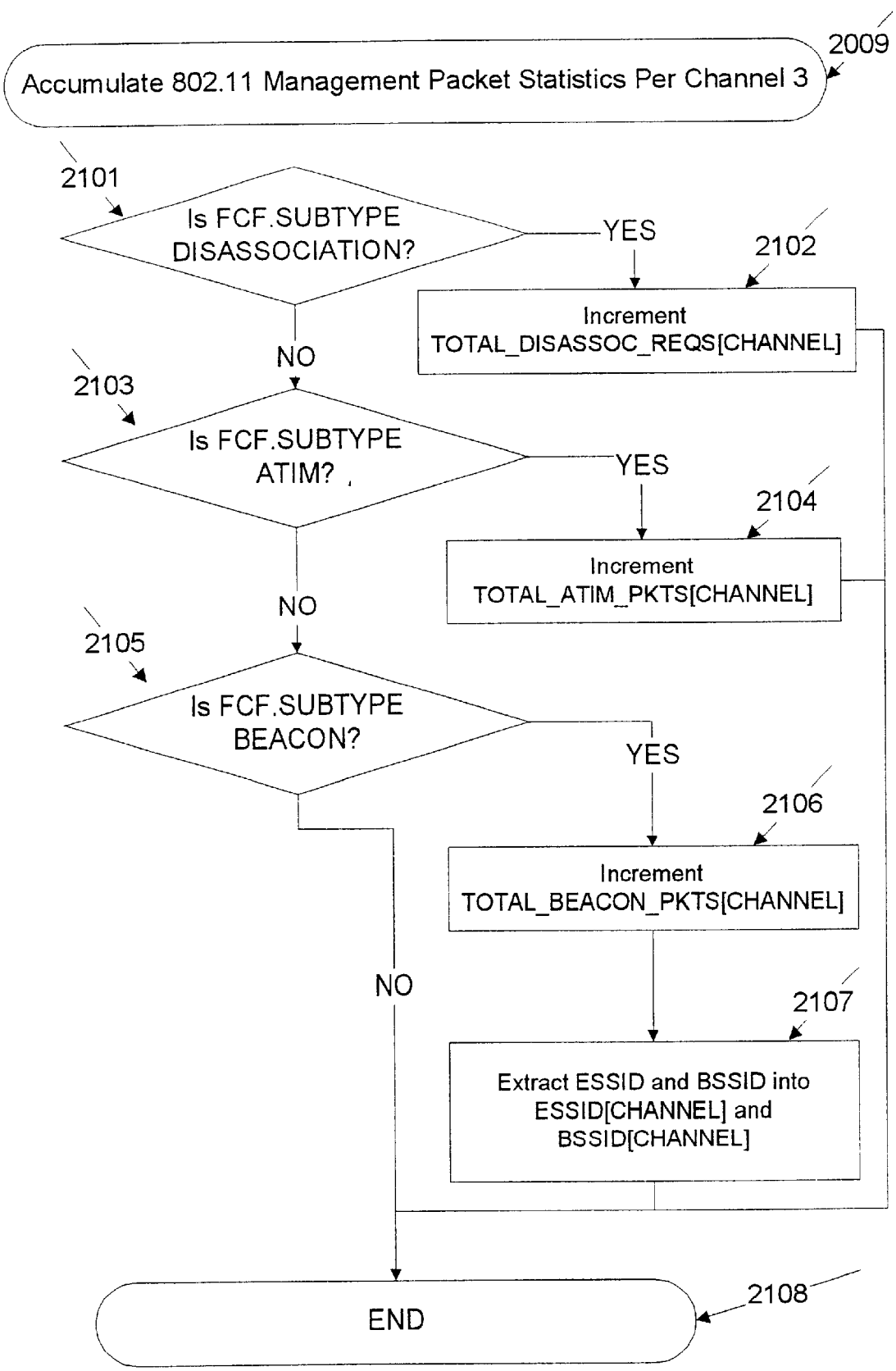
FIG. 21 is a flowchart of a subroutine showing the steps required for providing the "Accumulate Management Packet Statistics Per Channel 3" step of the flowchart of FIG. 20.

Referring to FIGS. 20 and 21, step 2009, Accumulate Management Packet Statistics Per Channel 3, is provided by a subroutine including steps 2101–2107, terminating at "END" 2108. Conditional step 2101 determines if the sub-type field of the 802.11 Frame Control Field contains the value indicating that the 802.11 Management frame is a DISASSOCIATION Management frame. If YES, then step 2102 increments the variable TOTAL_DISASSOC_REQS[CHANNEL]. If NO, then conditional step 2103 determines if the sub-type field of the 802.11 Frame Control Field contains the value indicating that the 802.11 Management frame is an ATIM Management frame. If YES, then step 2104 increments the variable TOTAL_ATIM_PKTS[CHANNEL]. If NO, then conditional step 2105 determines if the sub-type field of the 802.11 Frame Control Field contains the value indicating that the 802.11 Management frame is a BEACON Management frame. If YES, then step 2106 increments the variable TOTAL_BEACON_PKTS[CHANNEL], and step 2107 extracts the BSSID and ESSID from the data field of the Beacon frame, and stores that information in ESSID[CHANNEL] and BSSID[CHANNEL].

Figure 22:
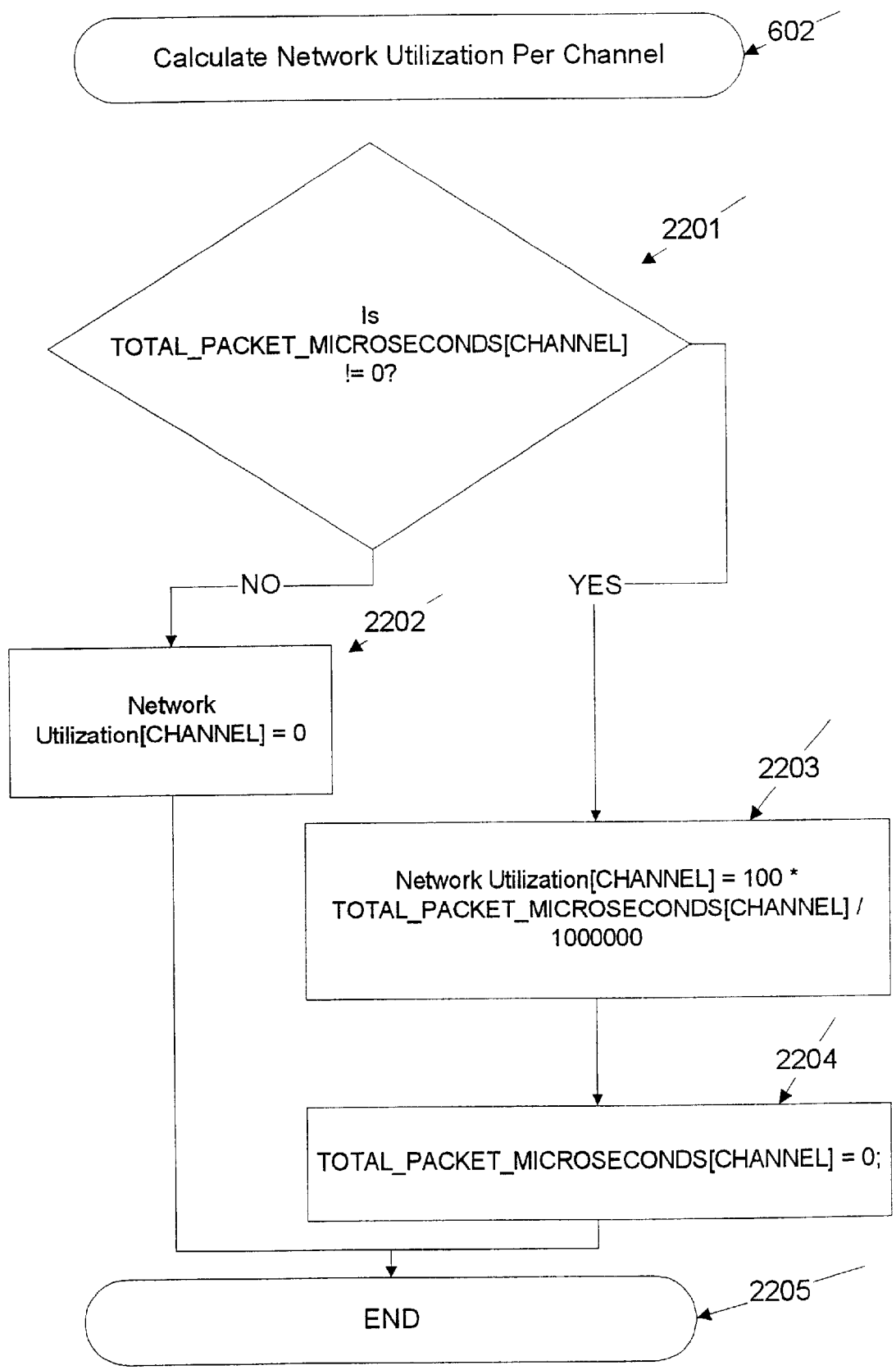
FIG. 22 is a flowchart showing a subroutine of the steps required to provide the "Calculate Network Utilization Per Channel" step of the flowchart of FIG. 6.

Referring to FIGS. 6 and 22, the step Calculate Network Utilization Per Channel (601) is providing by a subroutine including steps 2201–2204, terminating at "END" 2205. Conditional Step 2201 determines if the variable TOTAL_PACKET_MICROSECONDS[CHANNEL] is non-zero indicating that some packets were received in the previous second. If YES, then step 2203 will calculate the previous 1 second network utilization[CHANNEL] by dividing the TOTAL_PACKET_MICROSECONDS[CHANNEL] by 1,000,000, and then converting the result to percentage by multiplying by 100. Step 2204 resets the TOTAL_PACKET_MICROSECONDS[CHANNEL] to 0 for the next 1 second calculation. If the result of step 2201 is NO, then the network utilization[CHANNEL] is set to 0 in step 2202.

Figure 23:
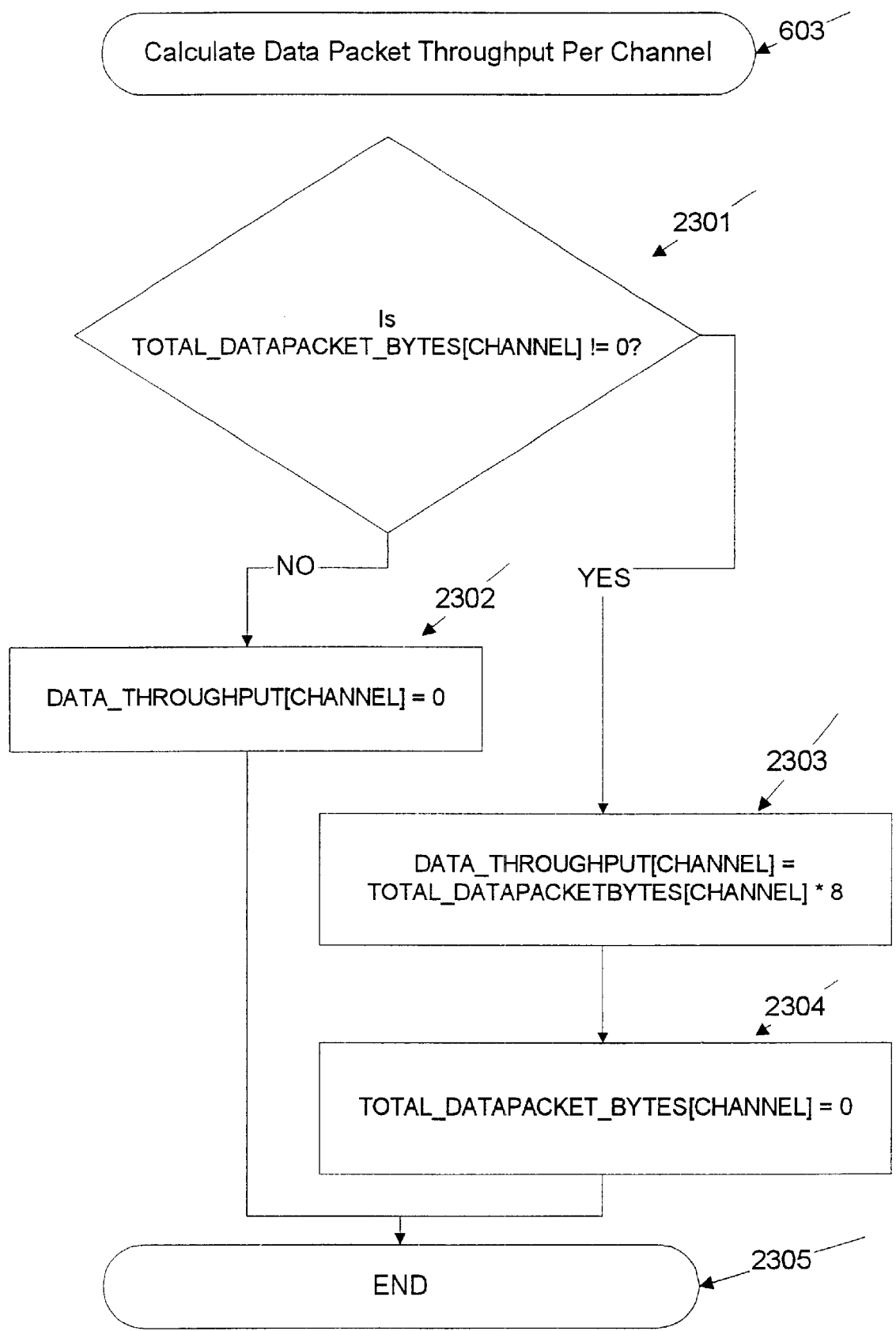
FIG. 23 is a flowchart showing a subroutine of the steps required for providing the "Calculate Data Throughput Per Channel" step of the flowchart of FIG. 6.

Referring to FIGS. 6 and 23, the step Calculate Data Packet Throughput Per Channel (602) is provided by a subroutine including steps 2301–2304, terminating at "END" 2305. Conditional Step 2301 determines if the variable TOTAL_DATAPACKET_BYTES[CHANNEL] is non-zero indicating that some of the received packets were 802.11 Data Packets in the 802.11 Frame Control Field type field. If YES, then step 2303 will calculate the previous 1 second Data Throughput[CHANNEL] by multiplying the total number of bytes*8 to get total number of bits transmitted in the previous second. Step 2304 then resets the TOTAL_DATAPACKET_BYTES[CHANNEL] to 0 for the next 1 second calculation. If the result of step 2301 is NO, then the Data Throughput[CHANNEL] is set to 0 via step 2302.

Figure 24:
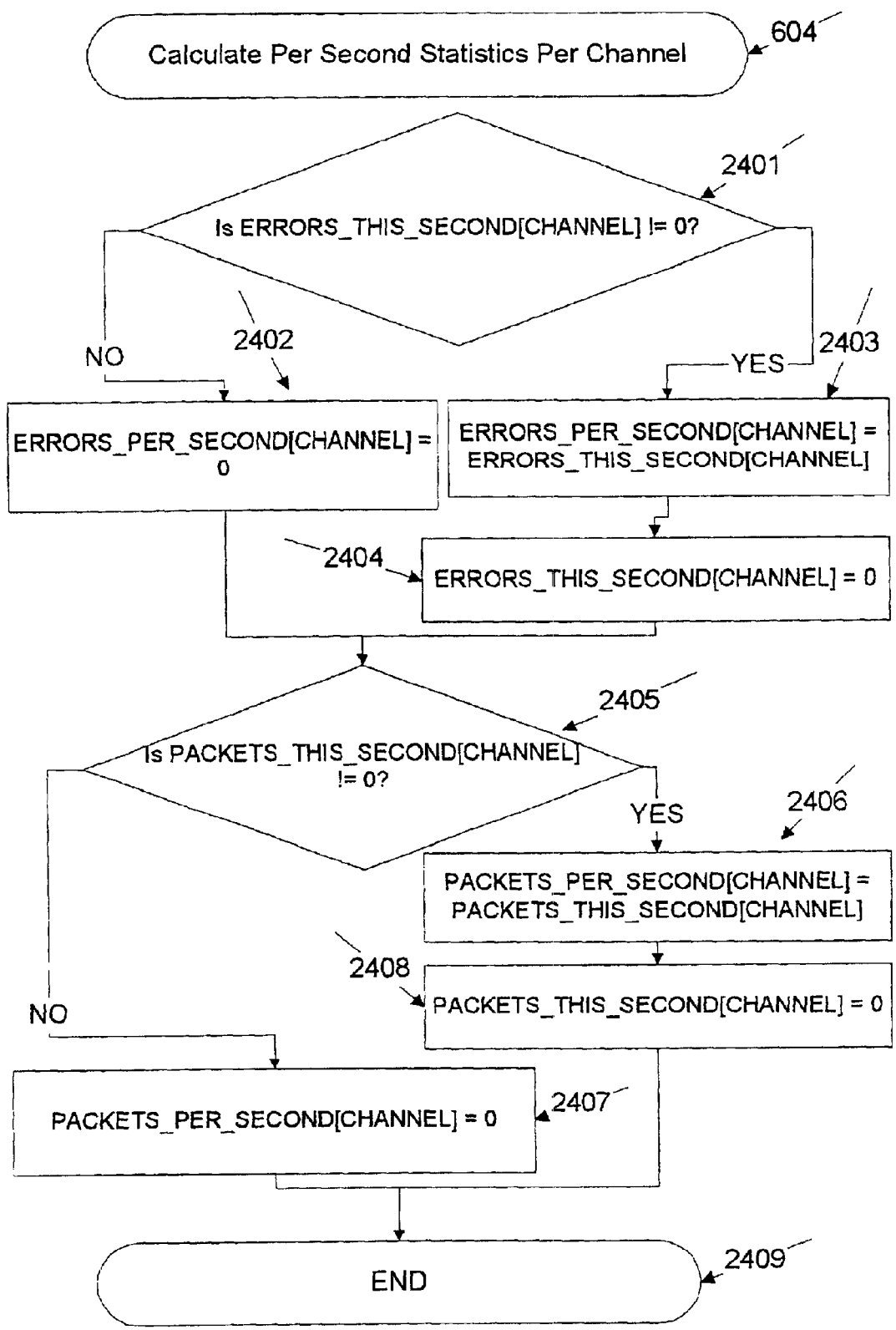
FIG. 24 is a flowchart showing a subroutine of the steps required for providing the "Calculate Per Second Statistics Per Channel" step of FIG. 6.

Referring to FIGS. 6 and 24, the step Calculate Per Second Statistics Per Channel (603) is provided by a subroutine including steps 2401–2407, terminating at "END" 2409. Conditional Step 2401 determines if the variable ERRORS_THIS_SECOND[CHANNEL] is not 0. If YES, then step 2403 sets the last second ERRORS_PER_SECOND[CHANNEL] value to the ERRORS_THIS_SECOND[CHANNEL] variable. Next, step 2404 resets the ERRORS_THIS_SECOND[CHANNEL] variable to 0. If the result of conditional step 2403 was NO, then the step 2402 sets ERRORS_PER_SECOND[CHANNEL] to 0. Conditional step 2405 determines if the variable PACKET_THIS_SECOND[CHANNEL] is non-zero. If YES, then step 2406 sets the variable PACKETS_PER_SECOND[CHANNEL] equal to the variable PACKETS_THIS_SECOND[CHANNEL]. Step 2408 then resets the variable PACKETS_THIS_SECOND[CHANNEL] to 0. If the result of conditional step 2405 was NO, then the step 2407 sets ERRORS_PER_SECOND[CHANNEL] to 0.

Although various embodiments of the invention have been shown, and described, they are not meant to be limiting. Those of skill in the art may recognize certain modifications thereto, which modifications are meant to be covered by the spirit and scope of the appended claims. For example, the invention is not limited to rd based wireless network, and can be used in any wireless network, such as one based on infrared transmission.

What is claimed is:

1. In an analyzer for a wireless network, a method for monitoring different channels, comprising:

selecting a plurality of individual channels to be monitored;

sequentially monitoring via channel surfing each of the selected ones of said plurality of individual channels to receive respective packets and associated packet information;

decoding said associated packet information for each packet online during monitoring of its associated channel;

analyzing the decoded information for said each packet in real time to determine if a condition exists to either stop said channel surfing or change to another channel, to either raise a stop flag or change flag, respectively;

either terminating channel surfing in response to said stop flag; or changing channels in response to said change flag.

2. The method of claim 1, further including the steps of:

extracting packet level information and statistics from each of said packets, and accumulating the information into a table sorted by associated channel numbers;

storing said table in memory;

reading said statistics from said memory to determine if a condition exists to either stop channel surfing, or change to another channel, to raise a stop flag or change flag, respectively;

terminating channel surfing in response to said stop flag; or changing channels in response to said change flag.

3. The method of claim 2, further including the steps of:

reading said statistics from said memory; and presenting said statistics on a computer screen display.

4. The method of claim 3, wherein the presentation of said statistics is in the form of said table.

5. The method of claim 3, wherein the presentation is graphical.

6. The method of claim 1, further including the step of displaying the decoded packet information.

7. The method of claim 1, further including the step of inputting said packets into a capture buffer for temporary storage pending decoding display, and/or storage on disc.

8. The method of claim 2, further including the steps of:
reading said statistics from said memory; and dumping said statistics into a desired file or files, respectively.

9. The method of claim 1, wherein said selecting step further includes the step of individually selecting the surfing or monitoring time period for each one of the selected channels, respectively.

10. In an analyzer for a wireless network, a method for monitoring different channels, comprising:
selecting a plurality of individual channels to be monitored;
sequentially monitoring via channel surfing each of the selected ones of said plurality of individual channels to receive respective packets and associated packet information;
extracting packet level information and statistics from each of said packets, and accumulating the information into a table sorted by associated channel numbers;
storing said table in memory;
reading said statistics from memory to determine if a condition exists to either stop channel surfing, or change to another channel, to either raise a stop flag or change flag, respectively;
either terminating channel surfing in response to said stop flag; or
changing channels in response to said change flag.

11. The method of claim 10, further including the steps of:
decoding said associated packet information for each packet online during monitoring of its associated channel;
analyzing the decoded information for each packet in real time to determine if a condition exists to either stop channel surfing or change to another channel, to either raise said stop flag or change flag, respectively;
either terminating channel surfing in response to said stop flag; or
changing channels in response to said change flag.

12. The method of claim 10, further including the steps of:
reading said statistics from memory; and
presenting said statistics on a computer screen display.

13. The method of claim 12, wherein the presentation of said statistics is in the form of said table.

14. The method of claim 11, wherein the presentation is graphical.

15. The method of claim 11, further including the step of displaying the decoded packet information.

16. The method of claim 10, further including the step of inputting said packets into a capture buffer for temporary storage pending decoding, display, and/or storage on disc.

17. The method of claim 10, further including the steps of:
reading said statistics from memory; and
dumping said statistics in a desired file or files, respectively.

18. The method of claim 10, wherein said selecting step further includes the step of individually selecting the surfing or monitoring time period for each one of the selected channels, respectively.

19. In an analyzer for a wireless network, a method for monitoring different channels, comprising:
selecting a plurality of individual channels to be monitored;
sequentially monitoring via channel surfing each of the selected ones of said plurality of individual channels to receive respective packets and associated packet information;
decoding said associated packet information for each packet online during monitoring of an associated channel;
analyzing the decoded information for each packet in real time to determine if a condition exists to either stop channel surfing or change to another channel, to either raise a stop flag or change flag, respectively;
either terminating channel surfing in response to said stop flag; or
changing channels in response to said change flag;
extracting packet level information and statistics from each of said packets, and accumulating the information into a table sorted by associated channel numbers;
storing said table in memory;
reading said statistics from said memory to determine if a condition exists to either stop channel surfing, or change to another channel, to either raise said stop flag or change flag, respectively;
either terminating channel surfing in response to said stop flag; or
changing channels in response to said change flag.

20. The method of claim 19, wherein said selecting step further includes the step of individually selecting the surfing or monitoring time period for each one of the selected channels, respectively.

21. The method of claim 19, further including the steps of:
reading said statistics from memory; and
presenting said statistics on a computer screen display.

22. The method of claim 21, wherein the presentation of said statistics is in the form of said table.

23. The method of claim 21, wherein the presentation is graphical.

24. In an analyzer for a wireless network, a method for monitoring different channels comprising:
selecting a plurality of individual channels to be monitored;
sequentially monitoring via channel surfing each one of said plurality of individual channels to extract desired statistics therefrom, respectively;
save said statistics in memory;
read said statistics from memory; and
sequentially analyze said statistics for each selected channel to determine whether a condition exists to either trigger termination of channel surfing, or change to another channel.

25. The method of claim 24, wherein said selecting step further includes the step of individually selecting the surfing or monitoring time period for each one of the selected channels, respectively.

26. An analyzer for detecting reasons for faulty communications in a wireless network, comprising:
an NIC for receiving wirelessly derived signals for a plurality of communication channels, said NIC card being controllable for receiving a desired channel at a given time;
a driver connected to said NIC and, said driver being both operable for receiving packets from said NIC associated with said channels, respectively, and programmable for providing control signals to said NIC to receive a particular channel at a given time;

a channel surfing control module programmable for individually selecting channels to be monitored via said control signals applied to said driver;

a packet decode module receptive of said packets from said driver; and a first detector module for raising one of two flags, either a flag to stop channel surfing upon detecting a fault condition in a packet, or a flag to change to another channel upon detecting a trigger condition, said flags being applied to said channel surfing control module.

27. The analyzer of claim 26, further including:

an extraction module connected to said driver for receiving packets, said extraction module being operative for extracting packet level information and statistics, and accumulating and collecting the information into a table sorted by channel number;

a memory for saving the table of statistics from said extraction module; and a second detector module for raising one of two flags, a flag to stop channel surfing upon detecting a fault condition, or a flag to change to another channel in the absence of a fault condition, said flags being applied to said channel surfing control module.

28. The analyzer of claim 26, wherein said channel surfing control module is further programmable for selecting the surfing or monitoring time period for each one of the selected channels, respectively.

29. In an analyzer for a wireless network, a method for monitoring different channels comprising:

selecting a plurality of individual channels to be monitored;

monitoring each one of said plurality of individual channels to extract desired statistics therefrom, respectively;

saving said statistics in memory;

reading said statistics from memory; and analyzing said statistics for each selected channel to determine whether a condition exists to perform an action.

30. In an analyzer for a wireless network, a computer program for monitoring different channels comprising:

computer code for selecting a plurality of individual channels to be monitored;

computer code for monitoring each one of said plurality of individual channels to extract desired statistics therefrom, respectively;

computer code for saving said statistics in memory;

computer code for reading said statistics from memory; and computer code for analyzing said statistics for each selected channel to determine whether a condition exists to perform an action.

* * * * *

UNITED STATES PATENT AND TRADEMARK OFFICE
CERTIFICATE OF CORRECTION

PATENT NO. : 6,768,721 B1
APPLICATION NO. : 10/001779
DATED : July 27, 2004
INVENTOR(S) : Peter O. Schmitz et al.

It is certified that error appears in the above-identified patent and that said Letters Patent is hereby corrected as shown below:

1. Column 27, line 9, replace "TOTAL_5_5 MBPS_PKTS[CHANNEL]" with --TOTAL_5_5MPBS_PKTS[CHANNEL]--

2. Column 27, line 12, replace "11 Mbps" with --11Mbps--

3. Column 27, line 13, replace "TOTAL_11 MBPS_PKTS" with --TOTAL_11MBPS_PKTS--

Signed and Sealed this

Twentieth Day of February, 2007

JON W. DUDAS
*Director of the United States Patent and Trademark Office*